US 12,184,195 B2

(12) United States Patent
Gonthier

(10) Patent No.: US 12,184,195 B2
(45) Date of Patent: Dec. 31, 2024

(54) ELECTRONIC CIRCUIT WITH THYRISTOR

(71) Applicant: STMICROELECTRONICS LTD, Kowloon (HK)

(72) Inventor: Laurent Gonthier, Taipei (TW)

(73) Assignee: STMICROELECTRONICS LTD, Kowloon (HK)

( * ) Notice: Subject to any disclaimer, the term of this patent is extended or adjusted under 35 U.S.C. 154(b) by 255 days.

(21) Appl. No.: 17/736,668

(22) Filed: May 4, 2022

(65) Prior Publication Data
US 2022/0360190 A1    Nov. 10, 2022

(30) Foreign Application Priority Data

May 7, 2021   (FR) ...................................... 2104852

(51) Int. Cl.
*H02M 7/155*   (2006.01)
*H02M 1/42*    (2007.01)

(52) U.S. Cl.
CPC ....... *H02M 7/1557* (2013.01); *H02M 1/4208* (2013.01)

(58) Field of Classification Search
CPC .. H02M 7/1557; H02M 7/155; H02M 1/4208; H02M 1/42
See application file for complete search history.

(56) References Cited

U.S. PATENT DOCUMENTS

| | | | |
|---|---|---|---|
| 4,811,189 A | 3/1989 | Harvest et al. | |
| 6,009,008 A | 12/1999 | Pelly | |
| 7,605,570 B2 | 10/2009 | Liu et al. | |
| 10,483,874 B2* | 11/2019 | Benabdelaziz | H02M 7/757 |
| 11,139,749 B2* | 10/2021 | Miyazaki | H02M 1/0085 |
| 11,228,239 B2* | 1/2022 | Benabdelaziz | H02M 7/217 |
| 11,271,493 B2* | 3/2022 | Gonthier | H03K 17/72 |
| 2020/0403525 A1* | 12/2020 | Miyazaki | H02M 1/0085 |
| 2021/0226553 A1* | 7/2021 | Gonthier | H02M 1/4208 |
| 2023/0412084 A1 | 12/2023 | Gonthier | |

FOREIGN PATENT DOCUMENTS

| | | |
|---|---|---|
| FR | 3027472 A1 | 4/2016 |
| JP | H04138063 A | 5/1992 |

OTHER PUBLICATIONS

Huber, et al., "Performance Evaluation of Bridgeless PFC Boost Rectifiers," IEEE Transactions on Power Electronics, vol. 23, No. 3, May 2008, 10 pages.
Sun et al., "1500-W AC Switch Bridgeless PFC Reference Design," Test Report: PMP2220, Texas Instruments, TIDT174 Apr. 2020, 22 pages.

* cited by examiner

*Primary Examiner* — Adolf D Berhane
(74) *Attorney, Agent, or Firm* — Seed IP Law Group LLP

(57) ABSTRACT

The present description concerns a converter comprising an AC-DC conversion stage comprising a first thyristor, a first power supply circuit delivering a first reference voltage between a first node and a second node, and a second power supply circuit delivering a second reference voltage between third and fourth nodes, the cathode of the first thyristor being coupled to the first node of the first power supply circuit by a first switch and being connected to the fourth node, the second power supply circuit comprising a first rectifying element coupled to the second node of the first power supply circuit and coupled to the third node.

23 Claims, 20 Drawing Sheets

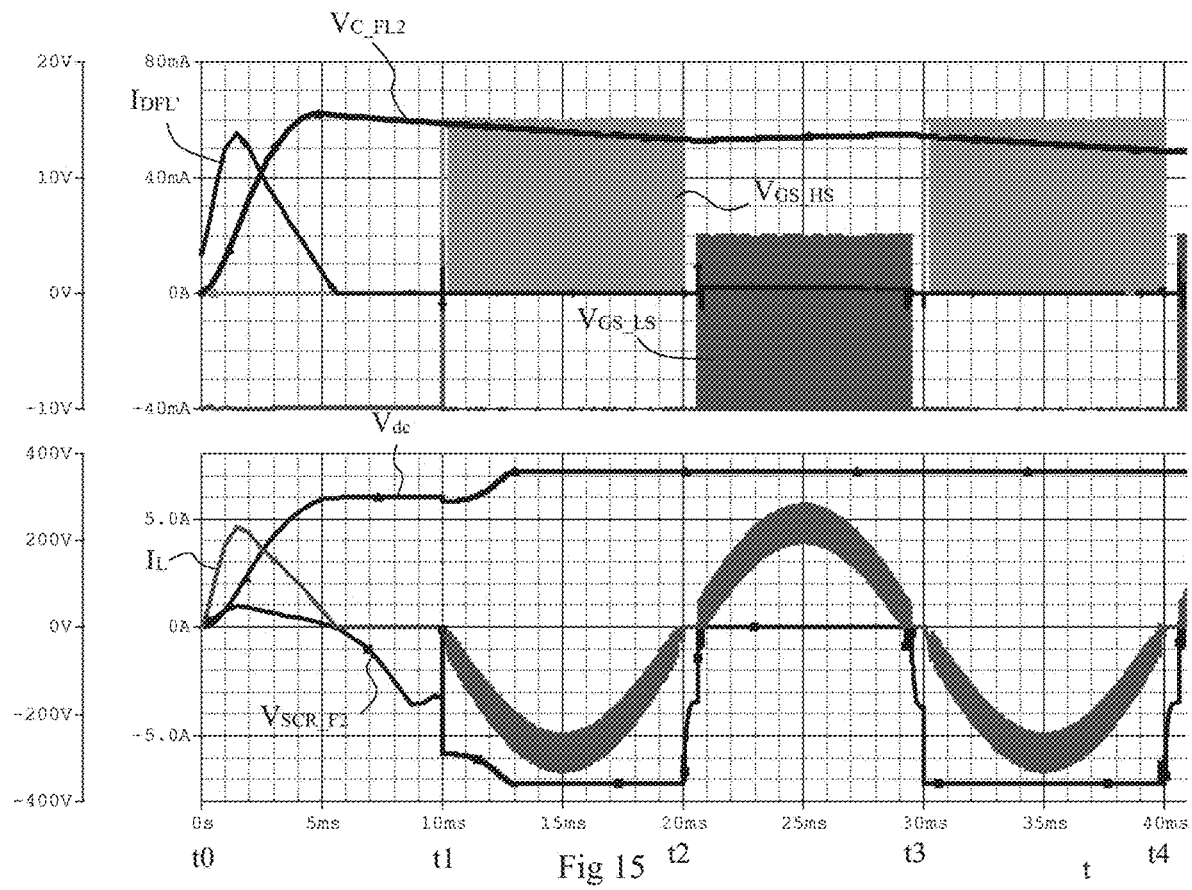
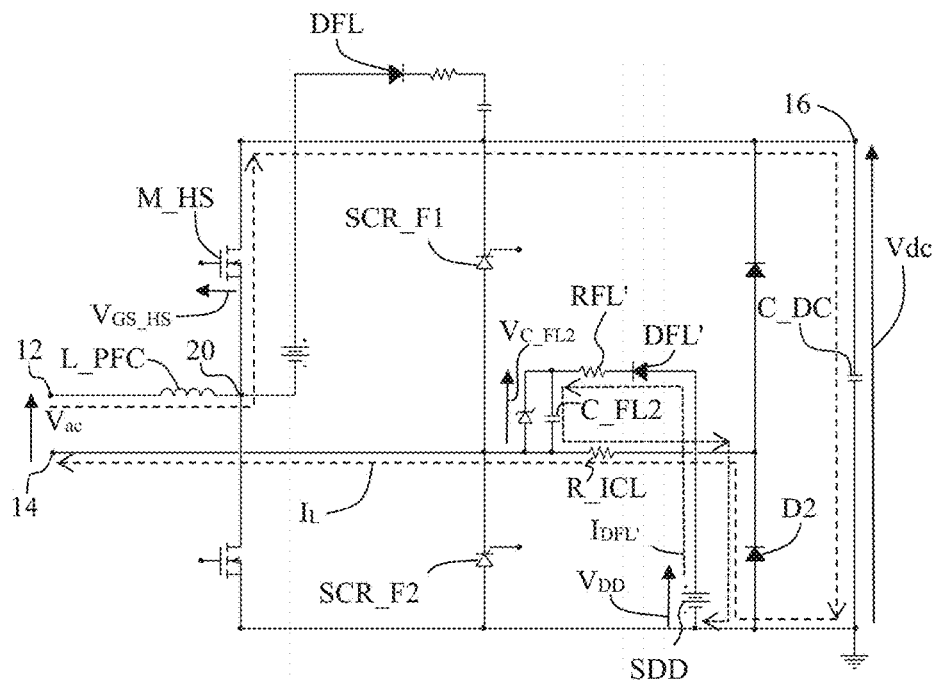
Fig 15
Fig 16

ELECTRONIC CIRCUIT WITH THYRISTOR

CROSS-REFERENCE TO RELATED APPLICATION(S)

This application claims the priority benefit of French patent application number 21/04852, filed on Jul. 5, 2021, entitled "ELECTRONIC CIRCUIT WITH THYRISTOR," which is hereby incorporated by reference to the maximum extent allowable by law.

BACKGROUND

Technical Field

The present disclosure generally relates to electronic circuits and, more specifically, to AC-DC converters with thyristor.

Description of the Related Art

An example of such a circuit concerns an AD/DC converter equipped with a power factor correction (PFC) function. AC-DC converters are for example used in electric motor control circuits, electric chargers, switched-mode power supplies, etc.

There particularly exist AC-DC converters of "totem pole"-type having a bridgeless architecture, of H bridge type, or of mixed active bridge type, these converters comprising two switches controlled in pulse-width modulation. An AC-DC converter with thyristor comprises at least one thyristor. The thyristor or the thyristors are particularly used to limit inrush currents during the converter operation or to short the inrush current limiting resistor after the phase of precharge of the capacitor located at the DC voltage output.

A disadvantage is that a circuit for powering each thyristor should be provided, and such a power supply circuit may have a complex structure, occupy a significant surface area on the converter, and have a significant cost.

BRIEF SUMMARY

An embodiment overcomes all or part of the disadvantages of AC-DC converters with thyristor.

An embodiment provides a converter comprising an AC-DC conversion stage comprising a first thyristor, a first power supply circuit delivering a first reference voltage between a first node and a second node, and a second power supply circuit delivering a second reference voltage between third and fourth nodes, the cathode of the first thyristor being coupled to the first node of the first power supply circuit by a first switch and being connected to the fourth node, the second power supply circuit comprising a first rectifying element coupled to the second node of the first power supply circuit and coupled to the third node.

According to an embodiment, the first rectifying element is a first diode.

According to an embodiment, the second power supply circuit comprises a first capacitor comprising a first electrode connected to the cathode of the first thyristor.

According to an embodiment, the first switch is a first MOS transistor.

According to an embodiment, the first switch is a second diode.

According to an embodiment, the AC-DC conversion stage comprises first and second terminals for the reception of an AC voltage and third and fourth terminals for the delivery of a DC voltage.

According to an embodiment, before the steady state, during a positive halfwave of the AC voltage, the first power supply voltage is activated after the DC voltage has exceeded a threshold, so that afterwards, the first capacitor is charged by a current flowing through the first rectifying element when the first switch is controlled to the on state.

According to an embodiment, the converter further comprises a second MOS transistor coupling the first node of the first power supply circuit to the fourth terminal, the third terminal being connected to the cathode of the first thyristor, and the second terminal being connected to the anode of the first thyristor.

According to an embodiment, the converter further comprises a second MOS transistor coupled to the first node of the first power supply circuit via an inductance and connected to the fourth terminal, the third terminal being connected to the cathode of the first thyristor, and the second terminal being connected to the anode of the first thyristor.

According to an embodiment, the second terminal is connected to the anode of the first thyristor and the first terminal is coupled to the first node of the first power supply circuit via an inductance.

According to an embodiment, the converter further comprises a second MOS transistor connected to the first node of the first power supply circuit, the second terminal being connected to the cathode of the first thyristor, the first terminal being coupled to the second MOS transistor via an inductance, and the anode of the first thyristor being connected to the fourth terminal.

According to an embodiment, the converter further comprises a second thyristor, the cathode of the second thyristor being connected to the cathode of the first thyristor, and the first terminal being connected to the anode of the second thyristor.

According to an embodiment, the first terminal is coupled to the first MOS transistor via an inductance, and the second terminal is connected to the cathode of the first thyristor, the anode of the first thyristor being coupled to the fourth terminal.

According to an embodiment, the converter comprises a second switch coupling the cathode of the first thyristor to the fourth terminal.

According to an embodiment, the AC-DC conversion stage comprises first and second terminals for the reception of an AC voltage and third and fourth terminals for the delivery of a DC voltage.

According to an embodiment, the converter comprises a second thyristor in series with the first thyristor, a third power supply circuit delivering a third reference voltage between the fourth terminal and a fifth node, and a fourth power supply circuit delivering a fourth reference voltage between sixth and seventh nodes, the cathode of the second thyristor being connected to the seventh node, the fourth power supply circuit comprising a second rectifying element coupled to the fifth node of the third power supply circuit.

According to an embodiment, the second rectifying element is a third diode.

According to an embodiment, the fourth power supply circuit comprises a second capacitor comprising a first electrode connected to the midpoint of the first and second thyristors.

According to an embodiment, the converter comprises fourth and fifth diodes series-coupled between the third and fourth terminals.

According to an embodiment, the converter comprises a second thyristor in series with the first thyristor, and the midpoint of the fourth and fifth diodes is coupled to the midpoint of the first and second thyristors by a first resistor.

According to an embodiment, the converter comprises first and second MOS transistors series-coupled between the third and fourth terminals, the second rectifying element is a third diode and, before the steady state, during a positive halfwave of the AC voltage, the second capacitor is charged by a current flowing through the first diode and the fifth diode.

According to an embodiment, the converter comprises a second thyristor in series with the first thyristor, and the first thyristor is a cathode-gate thyristor and the second thyristor is a cathode-gate thyristor.

According to an embodiment, the converter comprises a second thyristor in series with the first thyristor, the first thyristor is a cathode-gate thyristor, and the second thyristor is an anode-gate thyristor controlled by a positive or negative gate current.

BRIEF DESCRIPTION OF THE SEVERAL VIEWS OF THE DRAWINGS

The foregoing features and advantages, as well as others, will be described in detail in the following description of specific embodiments given by way of illustration and not limitation with reference to the accompanying drawings, in which:

FIG. 15 shows timing diagrams of voltages and of currents of the converter of FIG. 14 according to an embodiment of the converter operation;

FIG. 16 illustrates the flowing of currents through the converter of FIG. 14 in a first operating phase;

DETAILED DESCRIPTION

Like features have been designated by like references in the various figures. In particular, the structural and/or functional features that are common among the various embodiments may have the same references and may dispose identical structural, dimensional and material properties.

For the sake of clarity, only the steps and elements that are useful for an understanding of the embodiments described herein have been illustrated and described in detail. In particular, the circuits powered by the converter have not been detailed, the described embodiments being compatible with usual applications.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

Unless specified otherwise, the expressions "around," "approximately," "substantially" and "in the order of" signify within 10%, and preferably within 5%.

Figure 1:
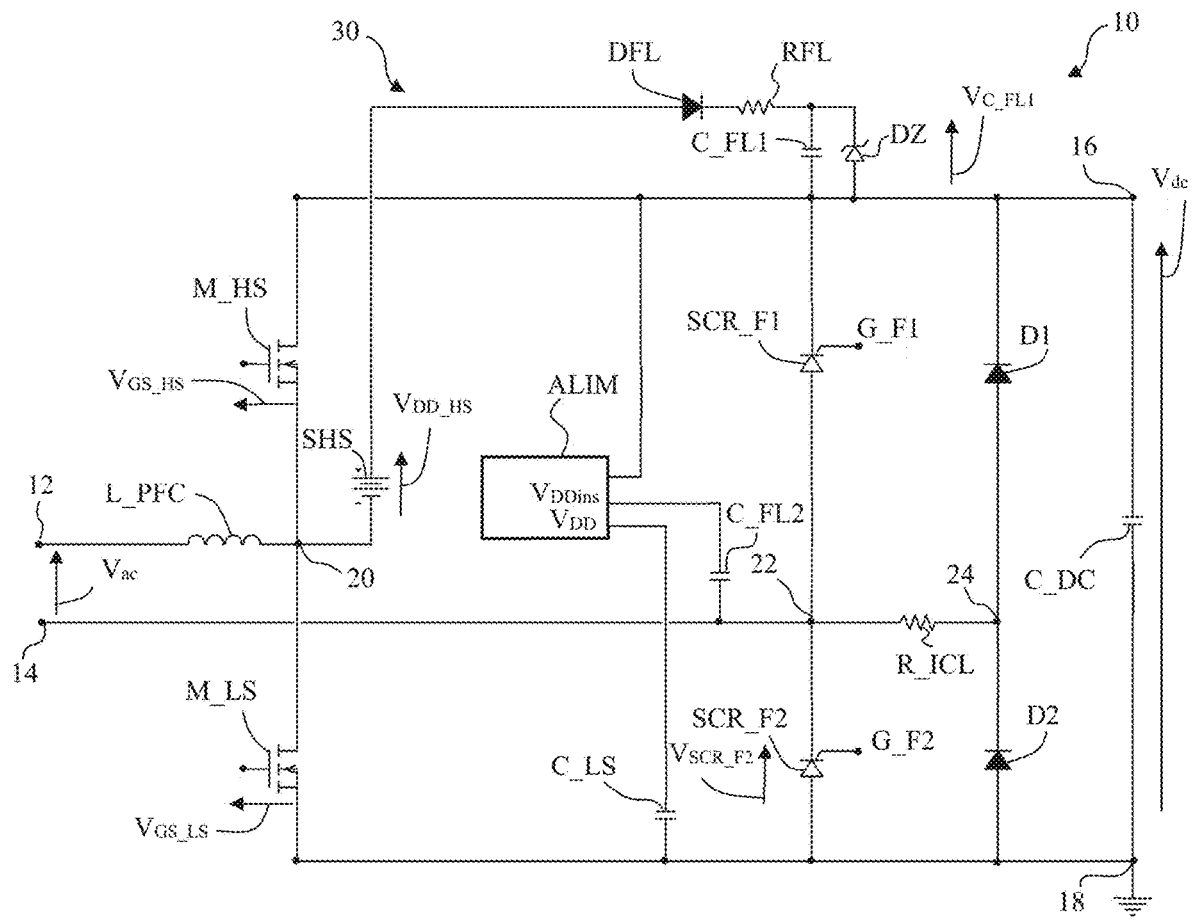
FIG. 1 partially and schematically shows an embodiment of a usual architecture of a so-called "totem pole" AC-DC power factor correction converter.
Figure 1:
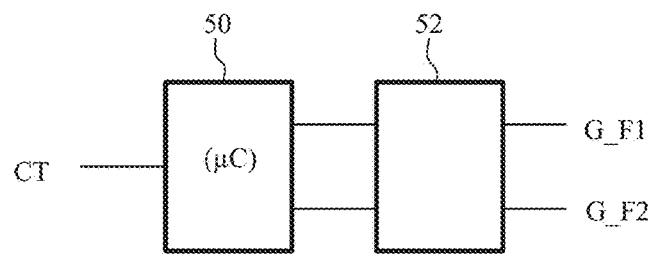

FIG. 1 schematically shows an embodiment of a "totem pole" AC-DC power factor correction converter 10. Converter 10 is for example used to deliver the DC voltage of an on-board network of a motor vehicle.

Two input terminals 12 and 14 are intended to receive an AC voltage $V_{ac}$, for example, the voltage of the electric distribution network (for example, 230 V or 120 V, 50 Hz or 60 Hz). Two output terminals 16 and 18 deliver a DC voltage $V_{dc}$, terminal 18 defining a reference potential, typically the ground. Output terminals 16 and 18 may be connected to another circuit, for example, to a DC/DC converter or to a DC/AC converter.

Terminal 12 is coupled to a first terminal of an inductive element L_PFC, having a second terminal coupled to the midpoint 20 of a series association of two switches M_HS and M_LS between the two terminals 16 and 18. According to an embodiment, each switch M_HS, M_LS corresponds to an enhancement mode MOS transistor, for example, of type N. The drain of MOS transistor M_HS is coupled, preferably connected, to terminal 16 and the source of MOS transistor M_HS is coupled, preferably connected, to midpoint 20. Call $V_{GS\_HS}$ the voltage between the gate of transistor M_HS and midpoint 20. The drain of MOS transistor M_LS is coupled, preferably connected, to midpoint 20 and the source of transistor MOS M_LS is coupled, preferably connected, to terminal 18. Call $V_{GS\_LS}$ the voltage between the gate of transistor M_LS and terminal 18.

Terminal 14 is connected to the midpoint 22 of a series association of two thyristors SCR_F1 and SCR_F2 between terminals 16 and 18, the anode of thyristor SCR_F2 being connected to terminal 18 and the cathode of thyristor SCR_F1 being connected to terminal 16. In the embodiment of FIG. 1, thyristor SCR_F1 has a cathode gate and thyristor SCR_F2 has a cathode gate. The gate of thyristor SCR_F1 receives a control signal G_F1. The gate of thyristor SCR_F2 receives a control signal G_F2. Call $V_{SCR\_F2}$ the voltage between the cathode and the anode of thyristor SCR_F2.

A resistor R_ICL connects midpoint 22 to the midpoint 24 of a series association of two diodes D1 and D2 between terminals 16 and 18, the anode of diode D2 being connected to terminal 18 while the cathode of diode D1 is connected to terminal 16. A storage and smoothing capacitor C_DC connects terminal 18 to terminal 16.

Converter 10 further comprises a power supply circuit SHS delivering a reference voltage $V_{DD\_HS}$ and a power supply circuit 30 delivering a reference voltage $V_{C\_FL1}$. Power supply circuit 30 comprises a diode DFL, a resistor RFL, a capacitor C_FL1, and a zener diode DZ. In the present embodiment, the negative terminal of source SHS is coupled, preferably connected, to midpoint 20, and the positive terminal of source SHS is coupled, preferably connected, to the anode of diode DFL. The cathode of diode DFL is coupled, preferably connected, to a terminal of resistor RFL. The other terminal of resistor RFL is coupled, preferably connected, to an electrode of capacitor C_FL1. The other electrode of capacitor C_FL1 is coupled, preferably connected, to terminal 16. Diode DZ is arranged in parallel with capacitor C_FL1, the anode of zener diode DZ being coupled, preferably connected, to terminal 16. The positions of diode DFL and of resistor RFL may be inverted. Resistor RFL and zener diode DZ may be absent. Reference voltage $V_{C\_FL1}$ corresponds to the voltage across capacitor C_FL1.

A reference voltage is a voltage that, in steady state, has a constant mean value in time with a ripple factor inferior to 10%, the ripple factor being equal to the ratio of RMS value of the AC component (ripple component) in the voltage to the DC component in the voltage.

Converter 10 may comprise other power supply circuits. FIG. 1 shows as an example a circuit ALIM for delivering a reference voltage $V_{DD}$ across a capacitor C_LS, and a reference voltage $V_{DDins}$ across a capacitor C_FL2. An electrode of capacitor C_FL2 is coupled, preferably connected, to midpoint 22. The other electrode of capacitor C_FL2 is coupled, preferably connected, to the terminal of circuit ALIM delivering voltage $V_{DDins}$. An electrode of capacitor C_LS is coupled, preferably connected, to terminal 18. The other electrode of capacitor C_LS is coupled, preferably connected, to the terminal of circuit ALIM delivering voltage $V_{DD}$. Another terminal of circuit ALIM is coupled, preferably connected, to terminal 16. Circuit ALIM receives DC voltage $V_{dc}$ based on which is delivers voltages $V_{DD}$ and $V_{DDins}$. As a variant, circuit ALIM may receive a rectified voltage from terminals 12 and 14.

Further, a turn-on switch, not shown, may be interposed between terminals 12 and 14 on the one hand, and inductance L_PFC and midpoint 22 on the other hand.

An electronic circuit 50, for example, a microcontroller (µC), generates pulses for controlling thyristor SCR_F1 from reference voltage $V_{C\_FL1}$ and pulses for controlling thyristor SCR_F2, for example from reference voltage $V_{DDins}$. Microcontroller 50 controls the gates of thyristors G_F1 and G_F2 via one or two isolated couplers 52 in optical, magnetic, or capacitive technology. As an example, coupler 52 comprises a phototransistor powered with reference voltage $V_{C\_FL1}$ and coupled to gate G_F1. This phototransistor is controlled by the light pulses emitted by a light-emitting diode controlled by microcontroller 50. Microcontroller 50 receives different set points CT or measurements to turn on thyristors SCR_F1 and SCR_F2 at the right times for the fullwave control in steady state and/or for the phase angle variation control during the starting phase. Transistors MOS M_HS and M_LS are controlled by a control circuit, not shown, or by microcontroller 50.

Figure 2:
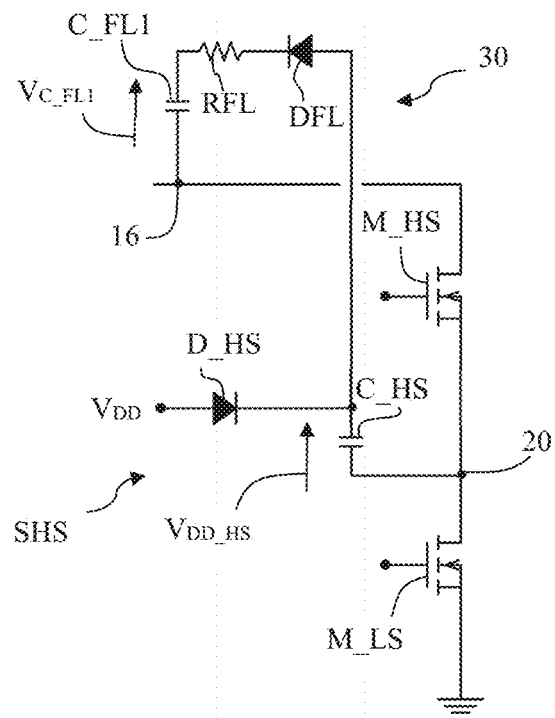
FIG. 2 partially and schematically shows an embodiment of a power supply circuit of the converter of FIG. 1.

FIG. 2 illustrates an embodiment of power supply circuit SHS. Power supply circuit SHS comprises a diode D_HS and a capacitor C_HS. An electrode of capacitor C_HS is coupled, preferably connected, to midpoint 20. The other electrode of capacitor C_HS is coupled, preferably connected, to the anode of diode DFL. The anode of diode D_HS is coupled, preferably connected, to the terminal of circuit ALIM, not shown in FIG. 2, delivering voltage $V_{DD}$. The cathode of diode D_HS is coupled, preferably connected, to the electrode of capacitor C_HS which is not coupled to midpoint 20, and is thus also coupled to the anode of diode DFL. Reference voltage $V_{DD\_HS}$ corresponds to the voltage across capacitor C_HS. In the following description, it is indifferently spoken of power supply circuit SHS delivering reference voltage $V_{DD\_HS}$ or of capacitor C_HS delivering reference voltage $V_{DD\_HS}$.

In steady state, thyristor SCR_F1 is made conductive, possibly intermittently, during each negative halfwave of voltage $V_{ac}$ referenced to terminal 14 and thyristor SCR_F2 is made conductive, possibly intermittently, during each positive halfwave of this same voltage $V_{ac}$. According to an embodiment, at least in steady state, transistors M_HS and M_LS are controlled in opposite fashion. This means that, at least in steady state, transistor M_HS is controlled to be non-conductive when transistor M_LS is controlled to be conductive and that transistor M_HS is controlled to be conductive when transistor M_LS is controlled to be non-conductive. In steady state, during positive halfwaves of voltage $V_{ac}$, thyristor SCR_F2 conducts and couples terminal 18, that is, the reference potential of output voltage $V_{dc}$, to terminal 14. Switch M_LS is controlled in pulse-width modulation (PWM) and switch M_HS is used as a freewheeling diode during periods when switch M_LS is off. During negative halfwaves of voltage $V_{ac}$, thyristor SCR_F1 conducts and couples terminal 14 to terminal 16, that is, to the high potential of output voltage $V_{dc}$. Switch M_HS is controlled in pulse-width modulation and switch M_LS is used as a freewheeling diode during periods when switch M_HS is off.

Call $V_{DS\_HS}$ the drain-source voltage of transistor M_HS, $I_L$ the current flowing through inductance L_PFC, taken as positive when it flows from terminal 12 to midpoint 20, and $I_{DFL}$ the current flowing through diode DFL, taken as positive when it flows from the anode to the cathode of diode DFL.

The operation of circuit 10 will now be described in further detail.

Figure 3:
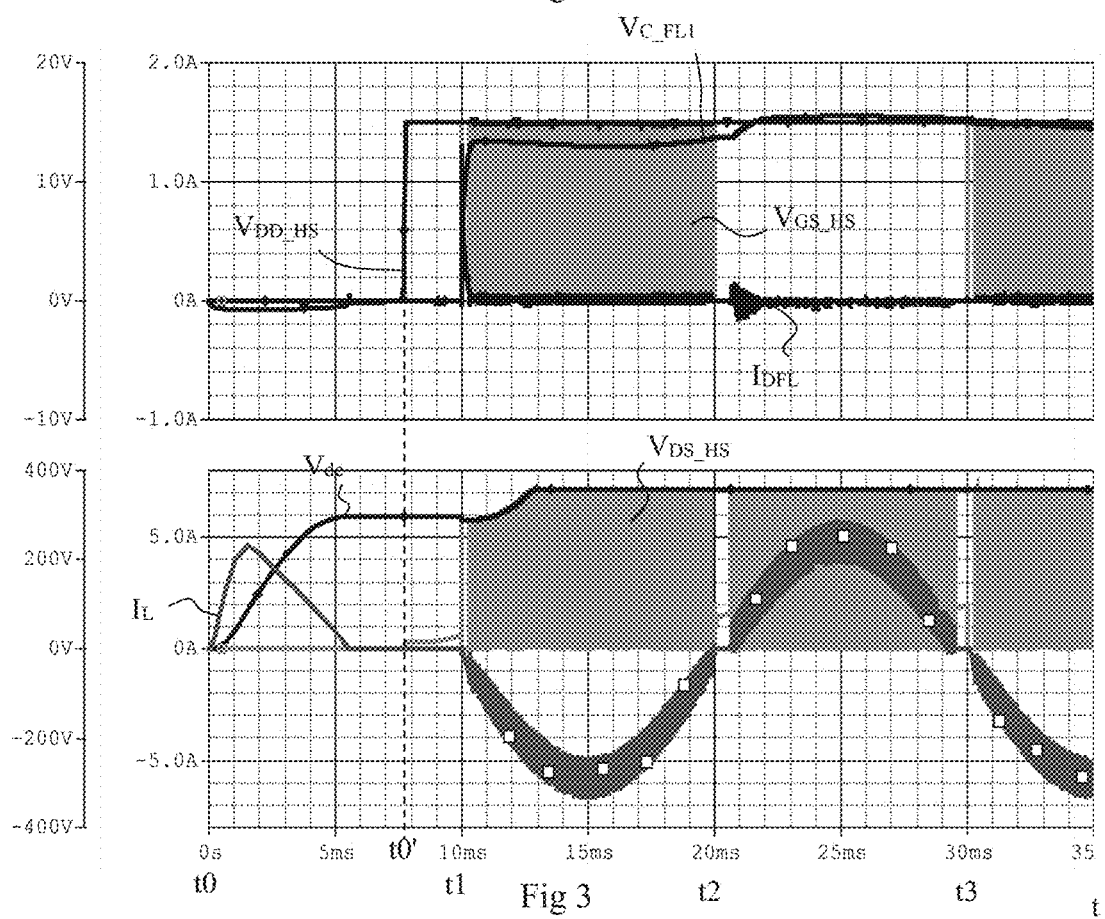
FIG. 3 shows timing diagrams of voltages and of currents of the converter of FIG. 1 according to an embodiment of the converter operation.

FIG. 3 shows timing diagrams of voltages $V_{C\_FL1}$, $V_{DD\_HS}$, $V_{GS\_HS}$, $V_{dc}$, and $V_{DS\_HS}$ and currents $I_L$ and $I_{DFL}$ of circuit 10 during a first charge followed by the steady-state operation for an embodiment of the operating method of the circuit 10 of FIG. 1. In FIG. 3, times t0, t0', t1, t2, and t3 are successive. Voltage $V_{ac}$, not shown in FIG. 3, exhibits positive halfwaves between times t0 and t1 and times t2 and t3, and a negative halfwave between times t1 and t2.

Figure 4:
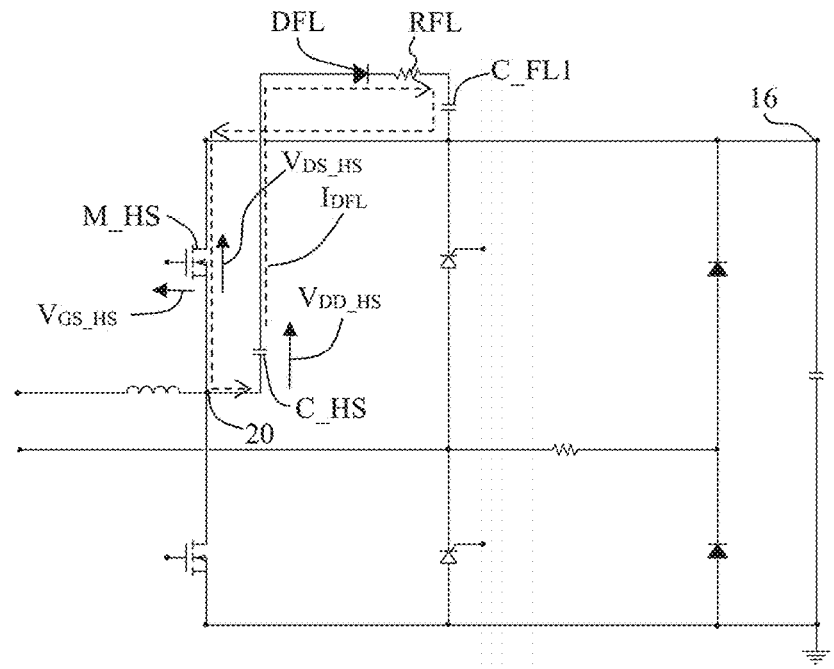
FIG. 4 illustrates the flowing of currents in the converter of FIG. 1 in an operating phase.

FIG. 4 is a figure similar to FIG. 1, only certain electronic components being shown, illustrating the flowing of current $I_{DFL}$ in converter 10 in steady state.

Figure 5:
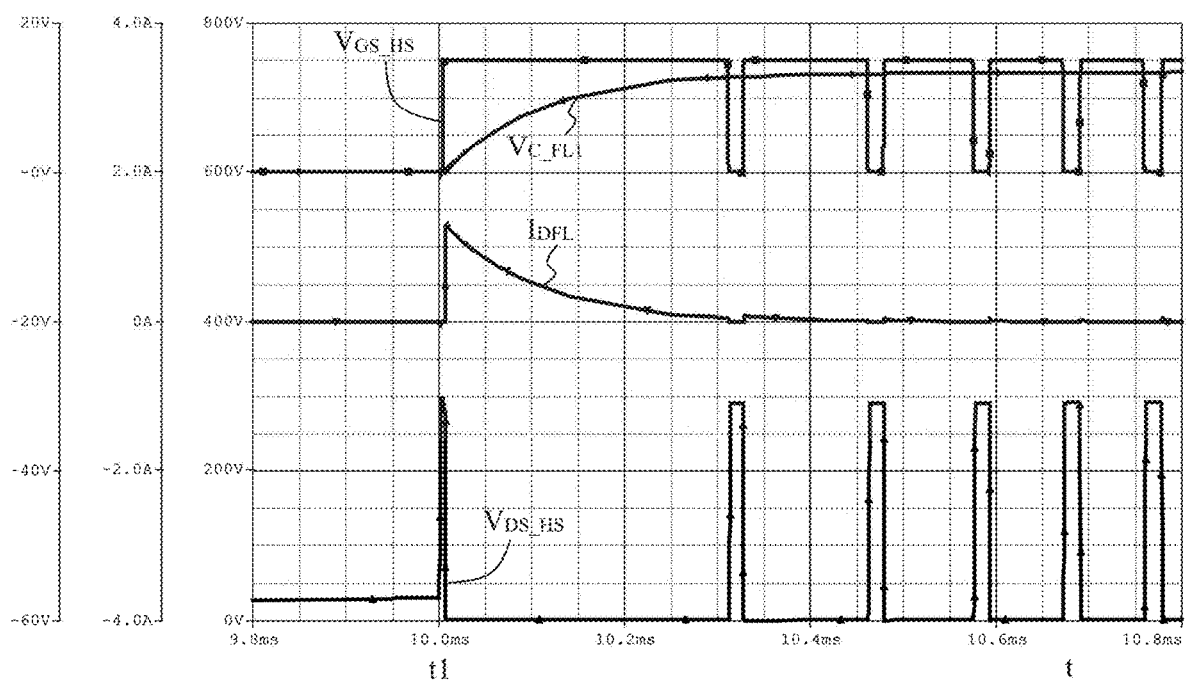
FIG. 5 shows a detail view of timing diagrams of FIG. 3.
Figure 6:
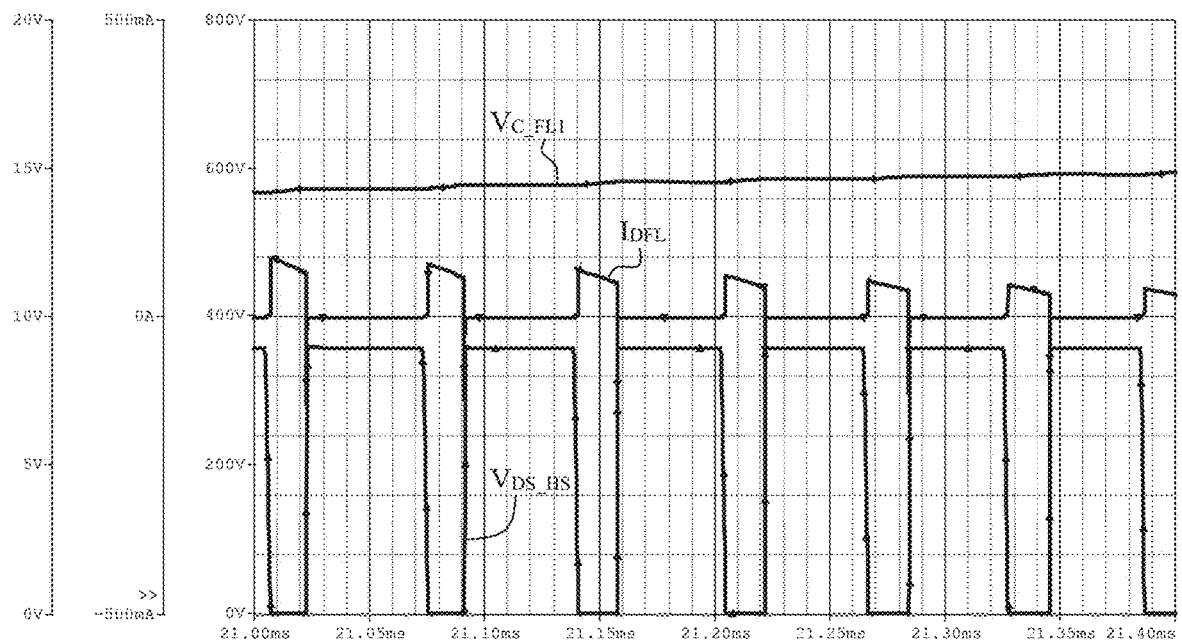
FIG. 6 shows another detail view of timing diagrams of FIG. 3.

FIG. 5 is an enlarged view of timing diagrams of FIG. 3 at the level of time t1 and FIG. 6 is an enlarged view of the timing diagrams of FIG. 3 little after time t2, during a negative halfwave.

Between times t0 and t1, at the first charge, switches M_HS and M_LS are controlled not to be conductive and thyristors SCR_F1 and SCR_F2 are controlled not to be conductive. Capacitor C_DC is precharged at the first positive halfwave of voltage $V_{ac}$. Positive current $I_L$ flows through the intrinsic diode of transistor M_HS and through diode D2. Current $I_L$ increases from 0 A, transits through a maximum, and then decreases down to 0 A. Voltage $V_{dc}$ rises up to a plateau.

After the charging of capacitor C_DC, and before the beginning of the steady-state operation, power supply circuit SHS is activated, which results in the increase of voltage $V_{DD\_HS}$ in FIG. 3 at time t0', between times t0 and t1. At the first negative halfwave of signal $V_{ac}$ in steady state between times t1 and t2, when transistor M_HS is made conductive for the first time at time t1, capacitor C_FL1 is charged by voltage $V_{DD\_HS}$ via diode DFL, resistor RFL, and transistor M_HS. Capacitor C_FL1 is then recharged each time transistor M_HS is made conductive or via the intrinsic diode of transistor M_HS which conducts a current flowing from node 20 to terminal 16 with a current much greater than the current which flows in reverse direction, from terminal 16 to node 20 originating from DFL, which ascertains that the internal diode of transistor M_HS remains on, while transistor M_HS is not controlled to be conductive. This operation is also ensured when the channel of M_HS is activated to decrease conduction losses.

From time t1, the steady-state operation of circuit 10 starts.

In steady state, thyristor SCR_F2 is made conductive, voltage $V_{SCR\_F2}$ then being equal to 0 V, during each positive halfwave of voltage $V_{ac}$ and is made non-conductive, voltage $V_{SCR\_F2}$ then being equal to the voltage between terminals 16 and 18, for example, approximately –400 V, during each negative halfwave of voltage $V_{ac}$. Thyristor SCR_F1 is made non-conductive during each positive halfwave of voltage $V_{ac}$ and is made conductive during each negative halfwave of voltage $V_{ac}$. Further, transistor M_HS is controlled by PWM, e.g., voltage $V_{GS\_HS}$ alternating between approximately 15 V and 0 V, during each negative halfwave of voltage $V_{ac}$ and is shown as being turned off, voltage $V_{GS\_HS}$ being at 0 V, during each positive halfwave of voltage $V_{ac}$ to simplify the timing diagrams, even if, in practice, it is controlled in opposite fashion to transistor M_LS during each positive halfwave, and is in particular turned on during freewheeling phases, as previously described. Further, transistor M_LS is controlled by PWM, voltage $V_{GS\_LS}$ decreased by 10 V, alternating between approximately 5 V and –10 V, during each positive halfwave of voltage $V_{ac}$ and is shown as being turned off, voltage $V_{GS\_LS}$ decreased by 10 V, then being equal to approximately –10 V, during each negative halfwave of voltage $V_{ac}$ to simplify the timing diagrams, even if, in practice, it is controlled in opposite fashion to transistor M_HS (with a short dead-time to avoid conduction of both transistors M_LS and M_HS at the same time) during each negative halfwave and is in particular turned on during freewheeling phases, as previously described. When thyristor SCR_F2 is conductive and switch M_LS is conductive, current $I_L$ flows from terminal 12, through inductance L_PFC, transistor M_LS, and thyristor SCR_F2, all the way to terminal 14.

Advantageously, zener diode DZ enables to set the maximum value of voltage $V_{C\_FL1}$ across capacitor C_FL1. Another circuit for setting the voltage of capacitor C_FL1 may be used instead of zener diode DZ.

Figure 7:
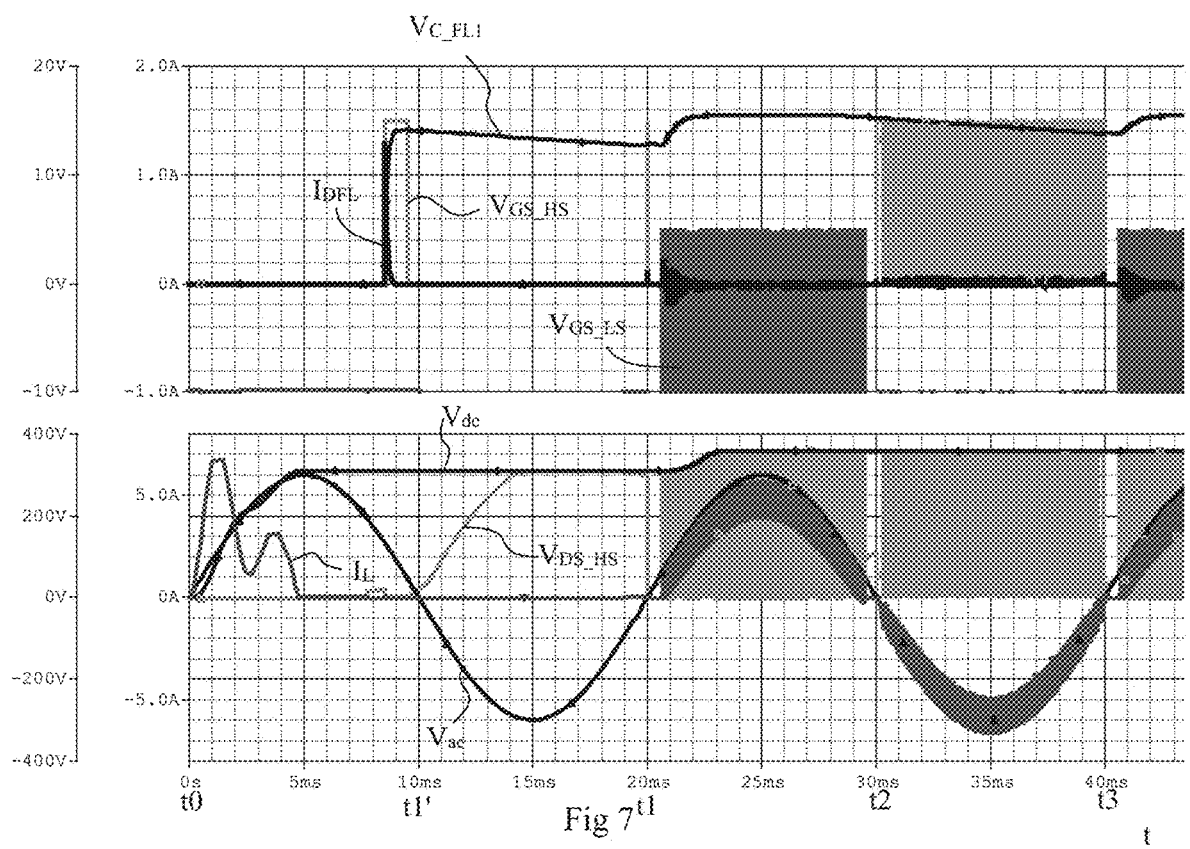
FIG. 7 shows timing diagrams of voltages and of currents of the converter of FIG. 1 according to another embodiment of the converter operation.

FIG. 7 is a figure similar to FIG. 3 and shows timing diagrams of voltages $V_{C\_FL1}$, $V_{GS\_HS}$, $V_{GS\_LS}$, $V_{dc}$, $V_{ac}$, and $V_{DS\_HS}$ and currents $I_L$ and $I_{DFL}$ of circuit 10 during a first charge followed by the steady state for another embodiment of the operating method of the circuit 10 of FIG. 1. In FIG. 7, the steady-state operation of the circuit starts as an example at time t1 by a positive halfwave of voltage $V_{ac}$, voltage $V_{ac}$ first exhibiting a positive halfwave between times t0 and t1' and a negative halfwave between times t1' and t2.

In this embodiment, the first charge of capacitor C_FL1 is achieved by turning on transistor M_HS during a portion of the first positive halfwave of voltage $V_{ac}$, which corresponds to the setting to the high state of signal $V_{GS\_HS}$ little before time t1'. Capacitor C_FL1 is then recharged in steady state, as previously described, each time transistor M_HS is made conductive or via the intrinsic diode of transistor M_HS while transistor M_HS is not controlled to be conductive.

Figure 8:
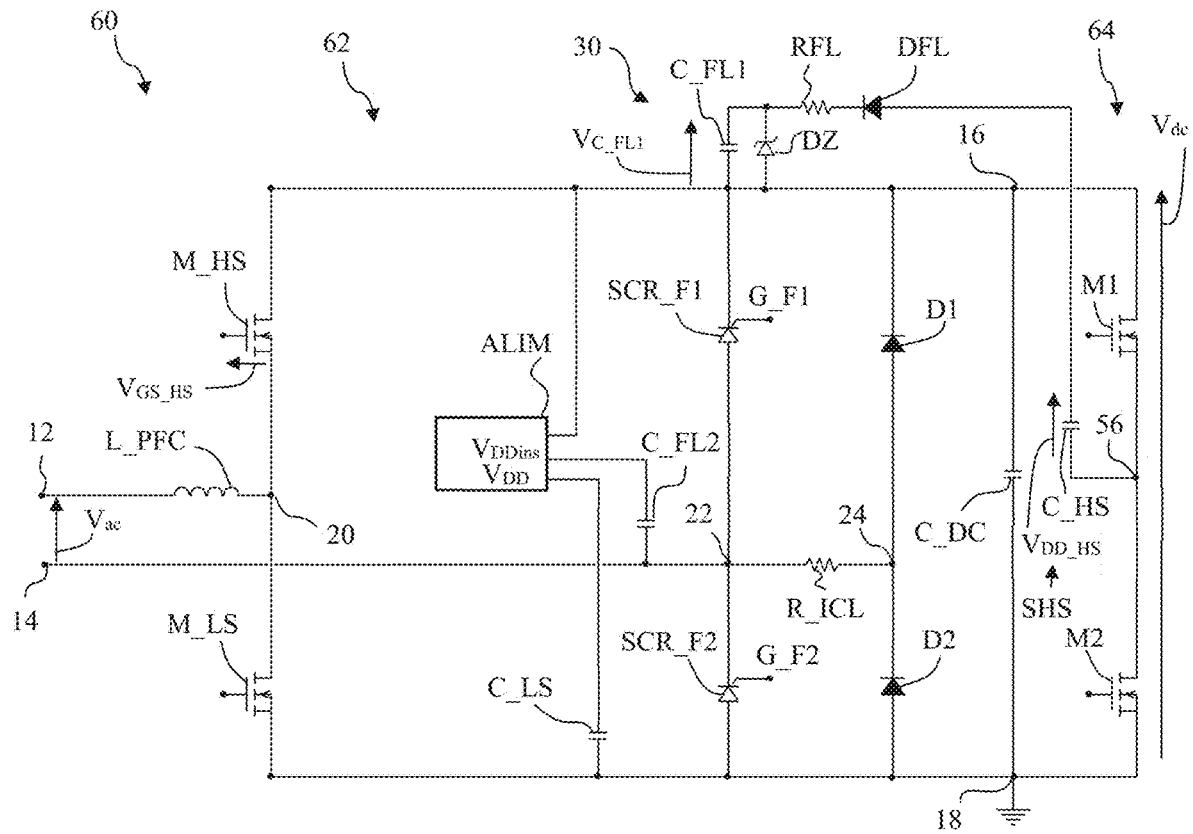
FIG. 8 partially and schematically shows another embodiment of an electronic circuit comprising a so-called "totem pole" AC-DC power factor correction converter and provided with an arm of a downstream converter (which is either of DC/DC type, or of DC/AC type)

FIG. 8 partially and schematically shows an embodiment of a circuit 60 comprising an AC-DC converter 62 coupled to another circuit 64, only partly shown in FIG. 8, for example, a DC/DC converter or a DC/AC converter. Converter 64 comprises a series association of two switches M1 and M2 between the two terminals 16 and 18. Converter 62 comprises all the elements of converter 10, with the difference that the electrode of the capacitor C_HS of power supply circuit SHS which, for converter 10, is coupled to the midpoint 20 of the two switches M_HS and M_LS, is, for converter 60, coupled to the midpoint 56 of the two switches M1 and M2. According to an embodiment, each switch M1, M2 corresponds to an enhancement mode MOS transistor, for example, of type N. The drain of MOS transistor M1 is coupled, preferably connected, to terminal 16 and the source of MOS transistor M1 is coupled, preferably connected, to midpoint 56. The drain of MOS transistor M2 is coupled, preferably connected, to midpoint 56 and the source of MOS transistor M2 is coupled, preferably connected, to terminal 18.

Call $V_{G\_F1}$ the voltage at gate G_F1 of thyristor SCR_F1, $V_{G\_F2}$ the voltage at gate G_F2 of thyristor SCR_F2, $I_L$ the current flowing through inductance L_PFC, taken as positive when it flows from terminal 12 to midpoint 20, $I_{DHS}$ the current flowing through transistor M_HS.

The operation of circuit 60 will now be described in further detail.

Figure 9:
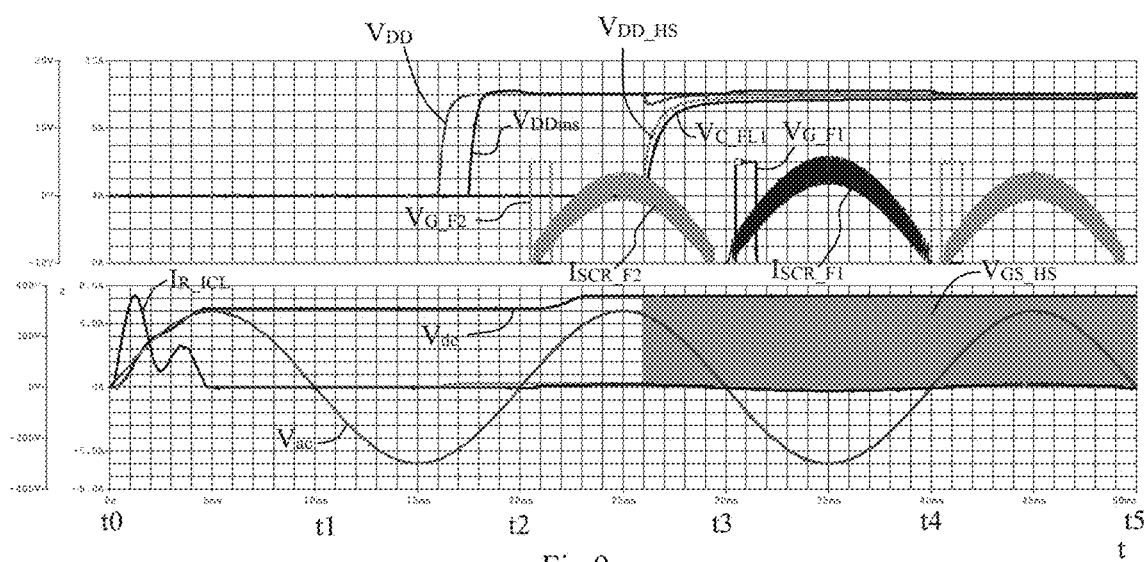
FIG. 9 shows timing diagrams of voltages and of currents of the circuit of FIG. 8 according to an embodiment of the circuit operation.

FIG. 9 shows timing diagrams of the voltages $V_{DD}$, $V_{DD\_HS}$, $V_{DDins}$, $V_{C\_FL1}$, $V_{G\_F1}$, $V_{ac}$, $V_{dc}$, and $V_{GS\_HS}$ and of the currents $I_{SCR\_F2}$, $I_{SCR\_F1}$, and $I_{R\_ICL}$ of circuit 60 during a first charge followed by the steady-state operation for an embodiment of the method of manufacturing the circuit 60 of FIG. 8. In FIG. 9, times t0, t1, t2, t3, t4, and t5 are successive. Voltage $V_{ac}$ exhibits positive halfwaves between times t0 and t1, times t2 and t3, and times t4 and t5, and negative halfwaves between times t1 and t2 and times t3 and t4.

Between times t0 and t1, at the first charge, switches M_HS and M_LS are controlled not to be conductive and thyristors SCR_F1 and SCR_F2 are controlled not to be conductive. Capacitor C_DC is precharged at the first positive halfwave of voltage $V_{ac}$. Positive current $I_L$ flows through the intrinsic diode of transistor M_HS and through diode D2. Current $I_{R\_ICL}$ increases from 0 A, transits through a maximum, and then decreases down to 0 A. Voltage $V_{dc}$ rises up to a plateau.

After the charging of capacitor C_DC, and before the beginning of the steady-state operation, circuit ALIM delivers voltage $V_{DD}$ and then voltage $V_{DDins}$. The establishing of voltage $V_{DDins}$ allows the setting to the on state of thyristor SCR_F2, which corresponds to the pulse of voltage $V_{G\_F2}$ little after time t2. In steady state, during positive halfwaves of voltage $V_{ac}$, thyristor SCR_F2 conducts and couples terminal 18, that is, the reference potential of output voltage $V_{ac}$, to terminal 14. Switch M_LS is controlled in pulse-width modulation (PWM) and switch M_HS is used as a freewheeling diode during periods when switch M_LS is off.

Circuit 64 is then started, which results in the rise of voltage $V_{DD\_HS}$. This causes the rise of voltage $V_{C\_FL1}$. The establishing of voltage $V_{C\_FL1}$ allows the setting to the on state of thyristor SCR_F1, which corresponds to the pulse of voltage $V_{G\_F1}$ little after time t3. From time t4, circuit 60 fully operates in steady state.

Figure 10:
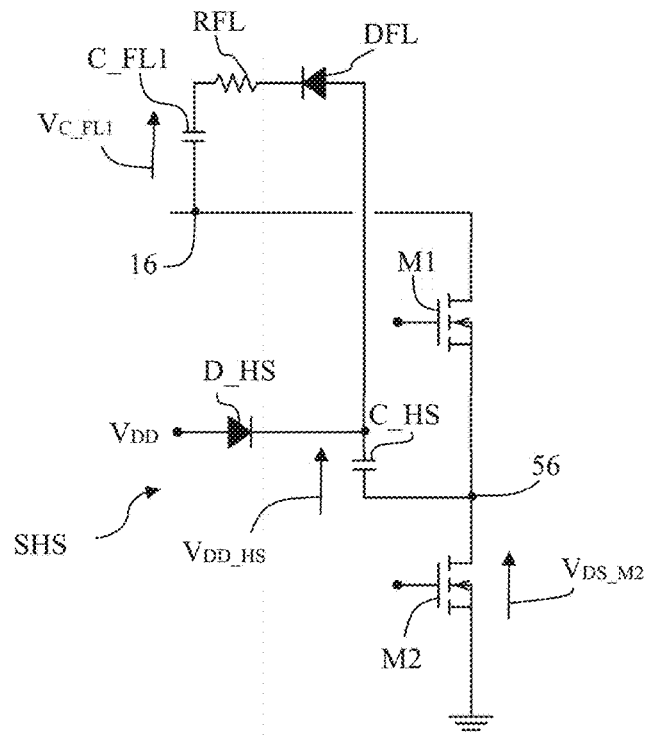
FIG. 10 partially and schematically shows an embodiment of a power supply circuit of the circuit of FIG. 8.

FIG. 10 illustrates an embodiment of the power supply circuit SHS delivering voltage $V_{DD\_HS}$ for the circuit 60 of FIG. 8. Source SHS comprises diode D_HS. The anode of diode D_HS is coupled, preferably connected, to the terminal of circuit ALIM, not shown in FIG. 10, delivering voltage $V_{DD}$. The cathode of diode D_HS is coupled, preferably connected, to the electrode of capacitor C_HS which is not coupled to midpoint 56, and thus to the anode of diode DFL. Call $V_{DS\_M2}$ the drain-source voltage of transistor M2 and $I_{D\_HS}$ the current flowing through diode D_HS.

Figure 11:
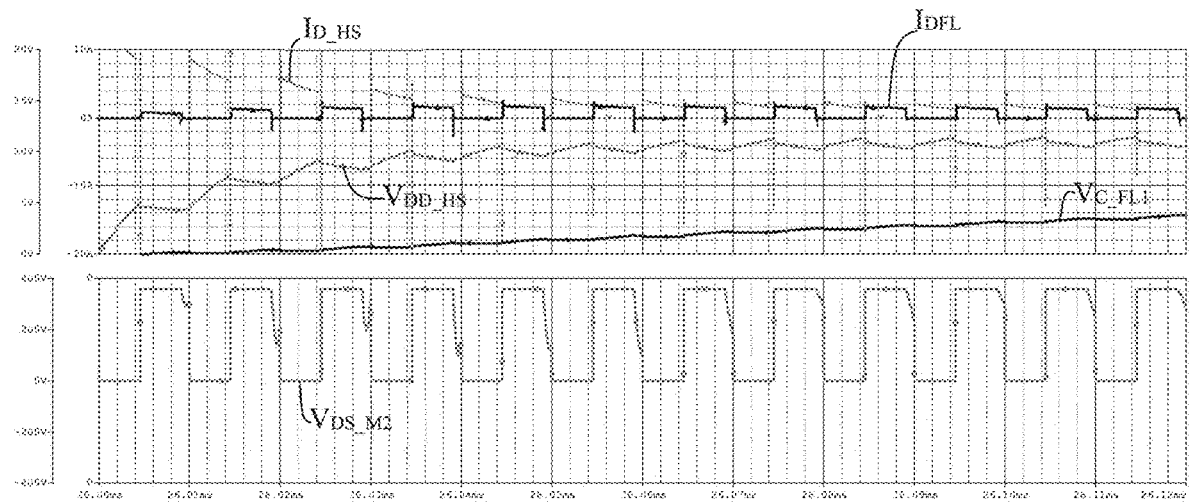
FIG. 11 shows a detail view of timing diagrams of FIG. 9 as well as other timing diagrams.

FIG. 11 is an enlarged view of the timing diagrams of the voltages $V_{C\_FL1}$ and $V_{DD\_HS}$ of FIG. 9 between times t2 and t3 and further comprises the timing diagrams of currents $I_{DFL}$, and $I_{D\_HS}$ and of voltage $V_{DS\_M2}$ when power supply circuit SHS has the structure shown in FIG. 10.

Transistors M1 and M2 are controlled in opposite fashion with a short dead-time to avoid both Transistors M1 and M2 to be conductive during the same time. This means that, at least in steady state, transistor M1 is controlled to be non-conductive when transistor M2 is controlled to be conductive and that transistor M1 is controlled to be conductive when transistor M2 is controlled to be non-conductive. When transistor M2 is controlled to be conductive (voltage $V_{DS\_M2}$ in the low state) and transistor M1 is controlled to be non-conductive, capacitor C_HS is charged by the current $I_{D\_HS}$ flowing through diode D_HS and transistor M2. When transistor M1 is controlled to be conductive and transistor M2 is controlled to be non-conductive (voltage $V_{DS\_M2}$ in the high state), capacitor C_FL1 is charged by the current $I_{DFL}$ flowing through diode DFL, resistor RFL, capacitor C_HS, and transistor M1.

Figure 12:
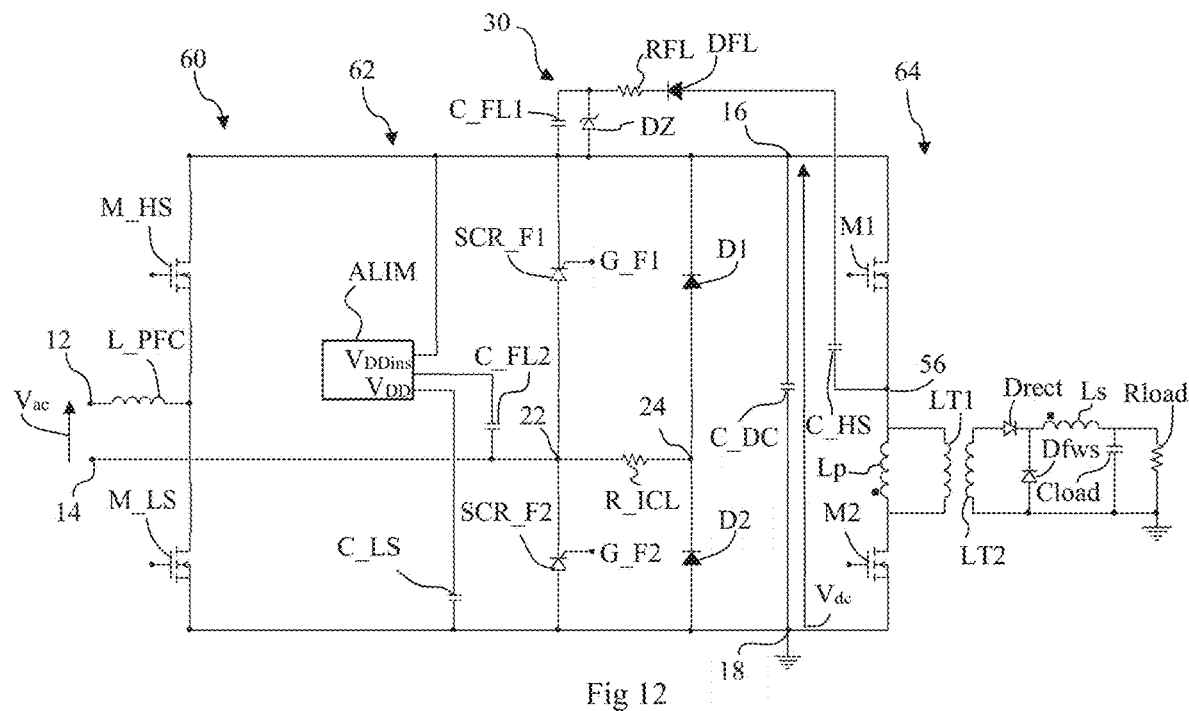
FIG. 12 partially and schematically shows another embodiment of an electronic circuit comprising a so-called "totem pole" AC-DC power factor correction converter and provided with a downstream DC/DC power converter stage.

FIG. 12 partially and schematically shows a variant of circuit 60 where circuit 64 is a DC/DC converter. As compared with FIG. 8, the converter 64 shown in FIG. 12 further comprises an inductance Lp in series between the two switches M1 and M2, and node 56, having an electrode of capacitor C_HS coupled thereto, is located between inductance Lp and switch M1. As an example, circuit 64 may correspond to a Forward-type DC/DC converter and then comprises a transformer, diodes Drect and Dfws, an inductance Ls, a capacitor Cload, and a resistor Rload. The primary winding LT1 of the transformer is coupled in parallel with inductance Lp. A first terminal of secondary winding LT2 of the transformer is coupled, preferably connected, to the anode of diode Drect. The cathode of diode Drect is coupled, preferably connected, to the cathode of diode Dfws. The anode of diode Dfws is coupled, preferably connected, to the second terminal of secondary winding LT2. A first terminal of inductance Ls is coupled, preferably connected, to the cathode of diode Drect. A first electrode of capacitor Cload is coupled, preferably connected, to the second terminal of inductance Ls. Resistor Rload is arranged in parallel with capacitor Cload.

Figure 13:
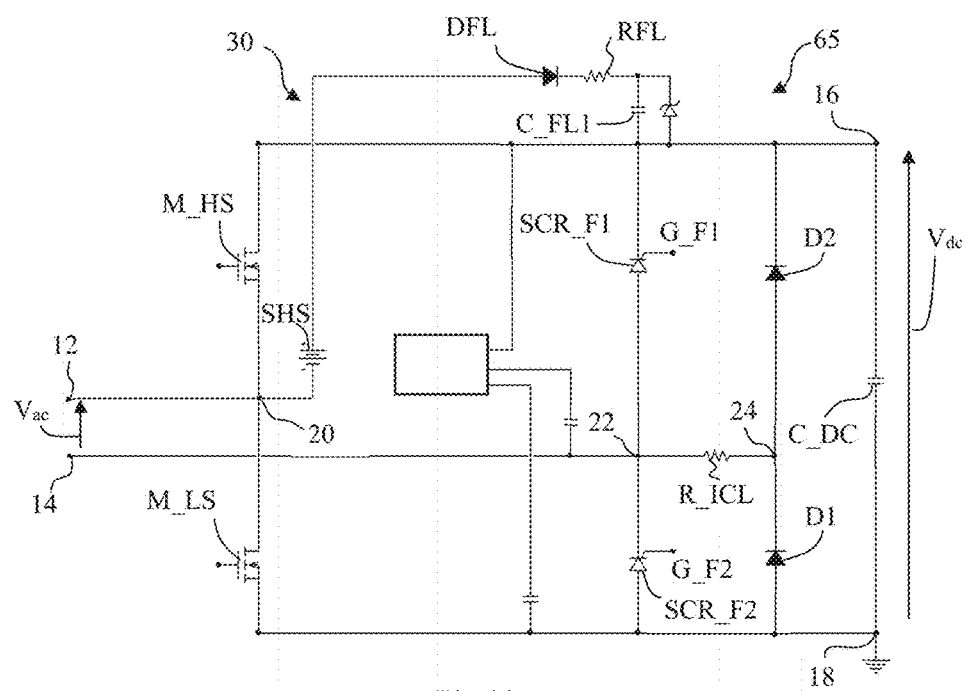
FIG. 13 partially and schematically shows an embodiment of a so-called "totem pole" AC-DC converter of rectifier type.

FIG. 13 schematically and partially shows an embodiment of a rectifier-type "totem pole" AC-DC converter 65. Converter 65 comprises all the elements of converter 10 shown in FIG. 1 with the difference that inductance L_PFC is not present. The operation of converter 65 may be identical to what has been previously described for converter 10, with the difference that switches M_HS and M_LS are controlled in full wave (and not in PWM) respectively for each positive and negative halfwave. Circuit 65 thus carries out a voltage rectification function and not a boost function with the possibility of correcting the power factor of the current sampled from the mains, as can be done by converter 10.

In the embodiments of the converter 10, 60, and 65 shown in FIGS. 1, 8, 12, and 13, thyristor SCR_F2 is a cathode-gate thyristor. As a variant, thyristor SCR_F2 may be an anode-gate thyristor. In this case, capacitor C_FL2 may be absent.

Figure 14:
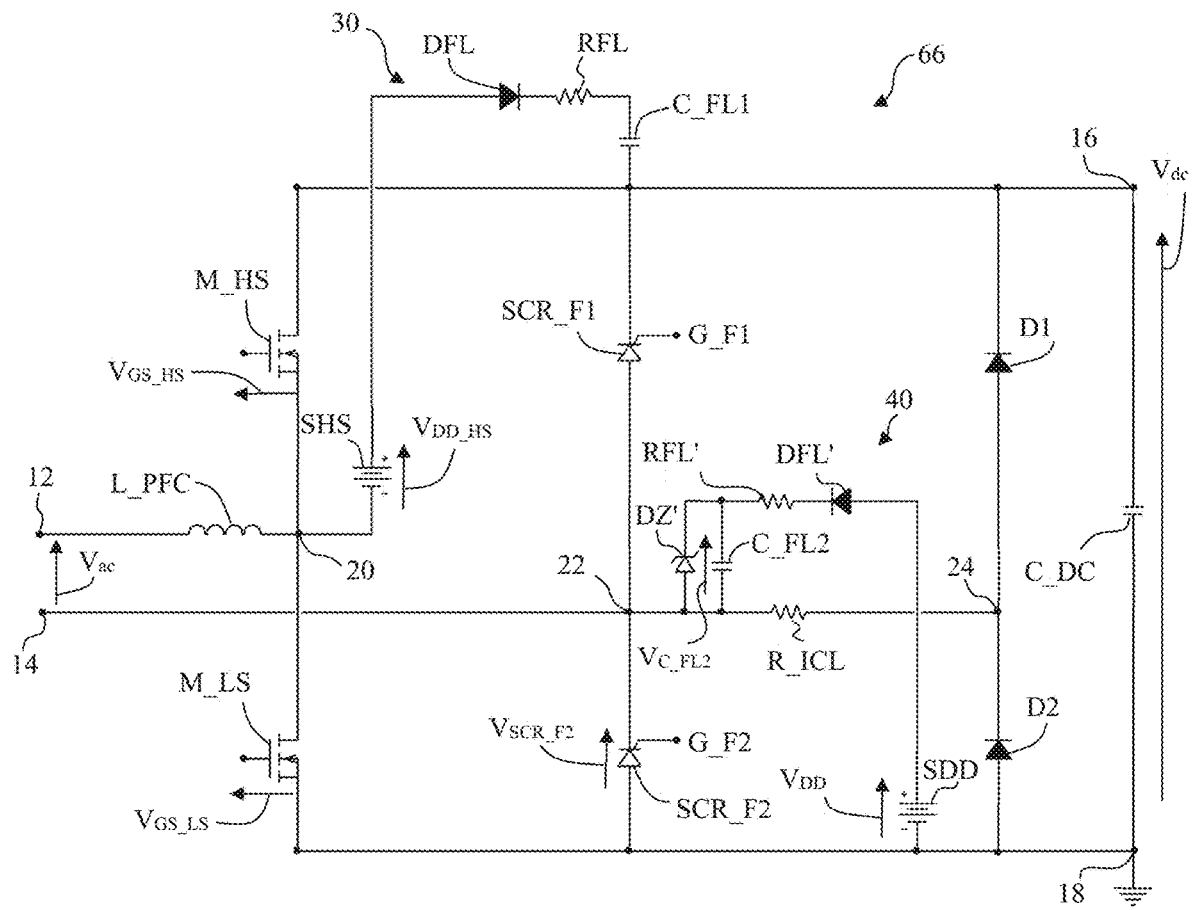
FIG. 14 partially and schematically shows an embodiment of a usual architecture of a so-called "totem pole" AC-DC power factor correction converter.
Figure 14:
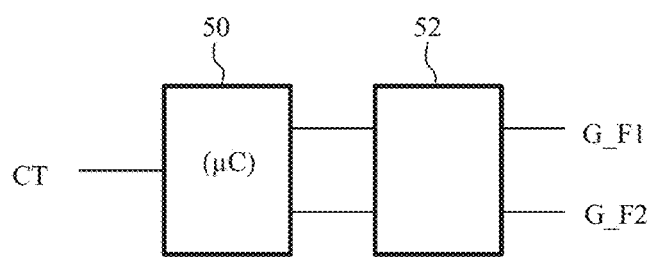

FIG. 14 schematically shows an embodiment of a "totem pole" AC-DC power factor correction converter 66. Converter 66 comprises all the elements of the converter 10 shown in FIG. 14 and further comprises a power supply circuit SDD delivering reference voltage $V_{DD}$ (where power supply circuit SDD may form part of the circuit ALIM shown in FIG. 14) and a power supply circuit 40 delivering a reference voltage $V_{C\_FL2}$ (which may correspond to the previously-described voltage $V_{DDins}$) based on reference voltage $V_{DD}$ and comprising a diode DFL', a resistor RFL', a capacitor C_FL2, and a zener diode DZ'. The negative terminal of source SDD is coupled, preferably connected, to terminal 18. The positive terminal of source SDD is coupled, preferably connected, to the anode of diode DFL'. The cathode of diode DFL' is coupled, preferably connected, to a terminal of resistor RFL'. The other terminal of resistor RFL' is coupled, preferably connected, to a first electrode of capacitor C_FL2. The second electrode of capacitor C_FL2 is coupled, preferably connected, to midpoint 22. Voltage $V_{C\_FL2}$ corresponds to the voltage across capacitor C_FL2. The anode of zener diode DZ' is coupled, preferably connected, to midpoint 22. The cathode of zener diode DZ' is coupled, preferably connected, to the first electrode of capacitor C_FL2. The positions of diode DFL' and of resistor RFL' may be inverted. Zener diode DZ' may be absent.

Call $I_{DFL'}$ the current flowing through diode DFL', taken as positive when it flows from the anode to the cathode of diode DFL'. In steady state, thyristors SCR_F1 and SCR_F2 and transistors M_HS and M_LS are controlled as previously described for converter 10. The operation of circuit 66 will now be described in further detail.

FIG. 15 shows timing diagrams of the voltages $V_{C\_FL2}$, $V_{GS\_HS}$, $V_{GS\_LS}$, $V_{dc}$, and $V_{SCR\_F2}$ and of the currents $I_L$ and $I_{DFL'}$ of circuit 66 during a first charge followed by the operation in steady state for an embodiment of the operating method of the circuit 66 of FIG. 14. In the timing diagrams, voltage $V_{GS\_LS}$ is shown as decreased by 10 V. In FIG. 15, times t0, t1, t2, t3, and t4 are successive. Voltage $V_{ac}$, not shown in FIG. 15, has positive halfwaves between times t0 and t1 and times t2 and t3, and negative halfwaves between times t1 and t2 and times t3 and t4.

FIG. 16 is a figure similar to FIG. 14 illustrating the flowing of currents $I_L$ and $I_{DFL'}$ through converter 66 during the first charge of capacitor C_FL2 and of capacitor C_DC between times t0 and t1.

Between times t0 and t1, at the first charge, switches M_HS and M_LS are controlled not to be conductive and thyristors SCR_F1 and SCR_F2 are controlled not to be conductive. Capacitor C_DC is precharged at the first positive halfwave of voltage $V_{ac}$. Positive current $I_L$ flows through the intrinsic diode of transistor M_HS and through diode D2. Current $I_L$ increases from 0 A, transits through a maximum, and then decreases to 0 A. Voltage $V_{dc}$ rises up to a plateau.

Between times t0 and t1, capacitor C_FL2 is charged by current $I_{DFL'}$ formed of a portion originating from the voltage $V_{DD}$ flowing through resistor RFL', diode DFL', resistor R_ICL, and diode D2, and another portion originating from the voltage $V_{ac}$ flowing through the capacitor of source SDD, resistor RFL', and diode DFL'. Current $I_{DFL'}$ increases from 0 A, transits through a maximum, and then decreases down to 0 A. Voltage $V_{C\_FL2}$ rises up to a maximum, and then slowly decreases. Current $I_{DFL'}$ is much lower than the current $I_L$ to which it subtracts, so that diode D2 remains on during this phase.

Advantageously, zener diode DZ' enables to set the maximum value of the voltage $V_{C\_FL2}$ across capacitor C_FL2. Another circuit for setting the voltage of capacitor C_FL2 may be used instead of zener diode DZ'.

From time t1, the steady-state operation of circuit 66 starts.

Figure 17:
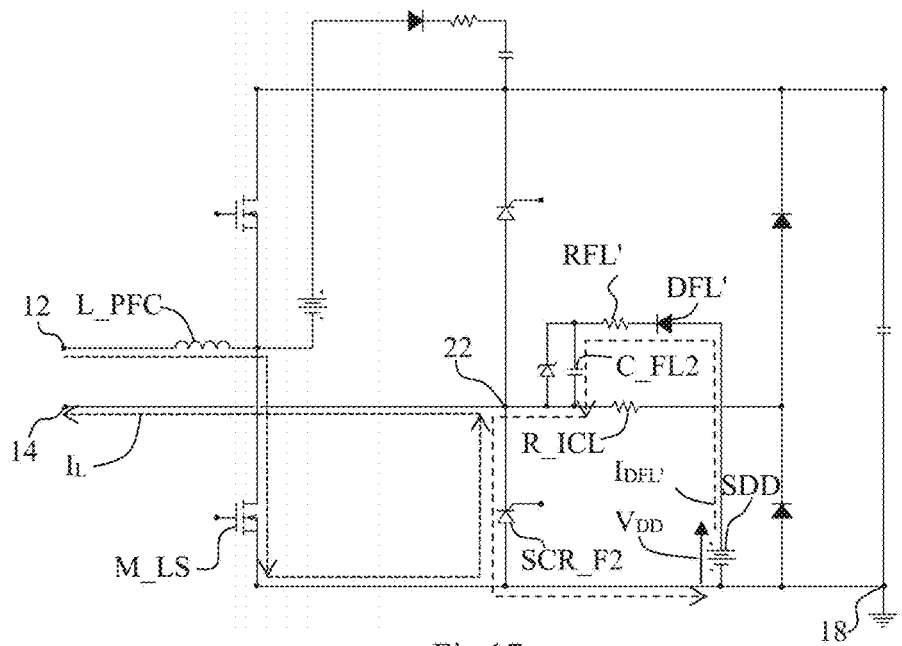
FIG. 17 illustrates the flowing of currents through the converter of FIG. 14 in a second operating phase.

FIG. 17 is a figure similar to FIG. 14 illustrating the flowing of current $I_L$ and $I_{DFL'}$ through the converter 66 of FIG. 14, during a positive halfwave of voltage $V_{ac}$ in steady state, for an embodiment of the operating method of converter 66.

In steady state, thyristor SCR_F2 is made conductive (voltage $V_{SCR\_F2}$ then being equal to 0 V) during each positive halfwave of voltage $V_{ac}$ and is made non-conductive (voltage $V_{SCR\_F2}$ then being equal to the voltage between terminals 16 and 18, that is, approximately −400 V) during each negative halfwave of voltage $V_{ac}$. Thyristor SCR_F1 is made non-conductive during each positive halfwave of voltage $V_{ac}$ and is made conductive during each negative halfwave of voltage $V_{ac}$. Further, transistor M_HS is controlled by PWM (voltage $V_{GS\_HS}$ alternating between approximately 15 V and 0 V) during each negative halfwave of voltage $V_{ac}$ and is shown as being turned off (voltage $V_{GS\_HS}$ being at 0 V) during each positive halfwave of voltage $V_{ac}$ to simplify the timing diagrams, even though, in practice, it is controlled in opposite fashion to transistor M_LS (with a dead-time as explained before) during each positive halfwave, and is in particular turned on during freewheeling phases, as previously described. Further, transistor M_LS is controlled by PMW (voltage $V_{GS\_LS}$ decreased by 10 V, alternating between approximately 5 V and −10 V) during each positive halfwave of voltage $V_{ac}$ and is shown as being turned off (voltage $V_{GS\_LS}$ decreased by 10 V then being equal to approximately −10 V) during each negative halfwave of voltage $V_{ac}$ to simplify the timing diagrams, even though, in practice, it is controlled in opposite fashion to transistor M_HS during each negative halfwave and is in particular turned on during freewheeling phases, as previously described.

In steady state, the recharge of capacitor C_FL2 is performed, during each positive halfwave of voltage $V_{ac}$, by the flowing of the current $I_{DFL'}$ due to the voltage $V_{DD}$ through diode DFL' and thyristor SCR_F2 when it is conductive. A slight increase in voltage $V_{C\_FL2}$ can be observed in FIG. 15 during the positive halfwave of voltage $V_{ac}$ between times t2 and t3.

When thyristor SCR_F2 is conductive and switch M_LS is conductive, current $I_L$ flows as shown in FIG. 17 from terminal 12, through inductance L_PFC, transistor M_LS, and thyristor SCR_F2, all the way to terminal 14.

In the embodiment previously described in relation with FIG. 14, thyristor SCR_F2 is a cathode-gate thyristor and thyristor SCR_F1 is a cathode-gate thyristor. However, it may be desirable for thyristor SCR_F2 to be selected to have an anode gate so that it is controlled from a control circuit referenced to terminal 18. Circuit 40 formed of electronic components C_FL2, DFL', RFL', and DZ' is then unnecessary. The control of anode-gate thyristor SCR_F2 may be achieved with a negative gate current, that is, which is sunk from the gate, which corresponds to the general case. However, the structure of the gate of thyristor SCR_F2 is configured to allow a control of the thyristor by a positive gate current.

Figure 18:
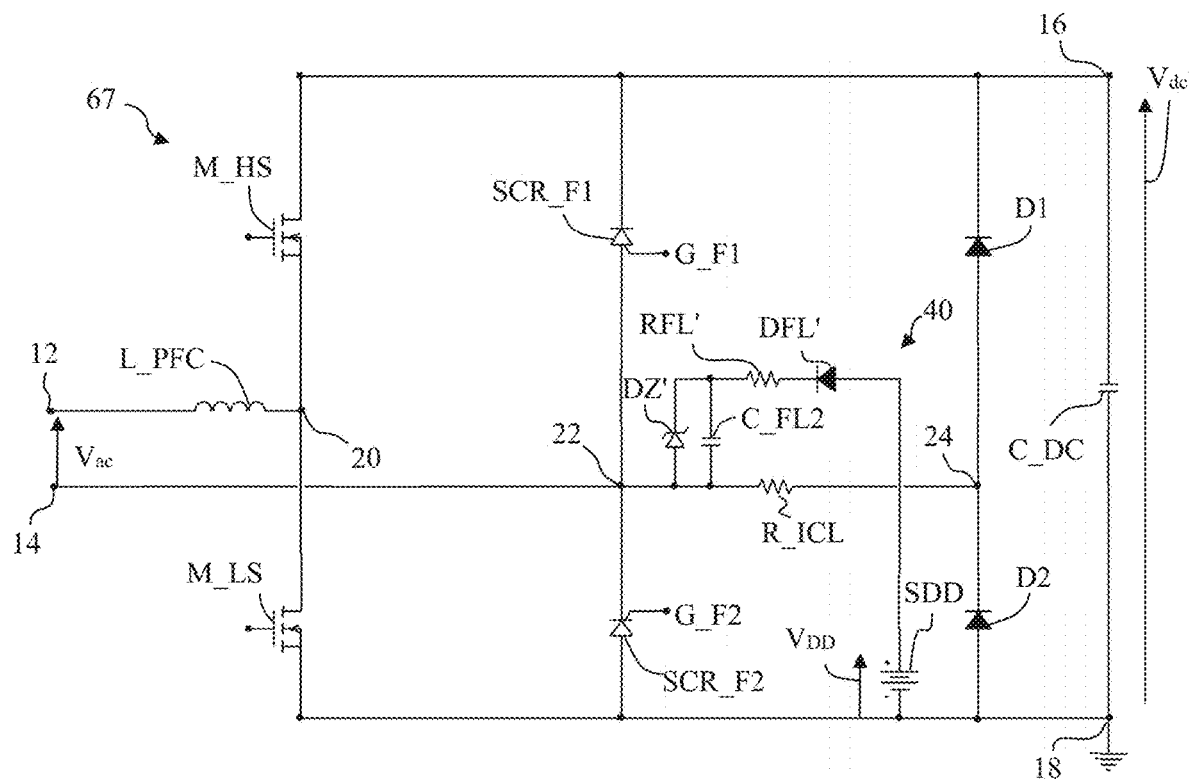
FIG. 18 partially and schematically shows another embodiment of a so-called "totem pole" AC-DC power factor correction converter.

FIG. 18 is a figure similar to FIG. 14 of another embodiment of a so-called "totem-pole" AC-DC power factor correction converter 67. Converter 67 comprises all the elements of the converter 66 shown in FIG. 14, with the difference that thyristor SCR_F1 is an anode-gate thyristor and that power supply circuit 30 is not present. The structure of the gate of thyristor SCR_F1 is configured to allow a control of thyristor SCR_F1 by a positive gate current while an anode-gate thyristor is generally controlled by a negative gate current, that is, which is sunk from the gate.

Thyristor SCR_F1 being an anode-gate thyristor, its control signal is thus referenced to midpoint 22. Thyristor SCR_F2 is a cathode-gate thyristor. Its control signal is thus referenced to the same midpoint 22. This embodiment advantageously enables to use power supply circuit 40 for thyristor SCR_F2 and also for thyristor SCR_F1.

Figure 19:
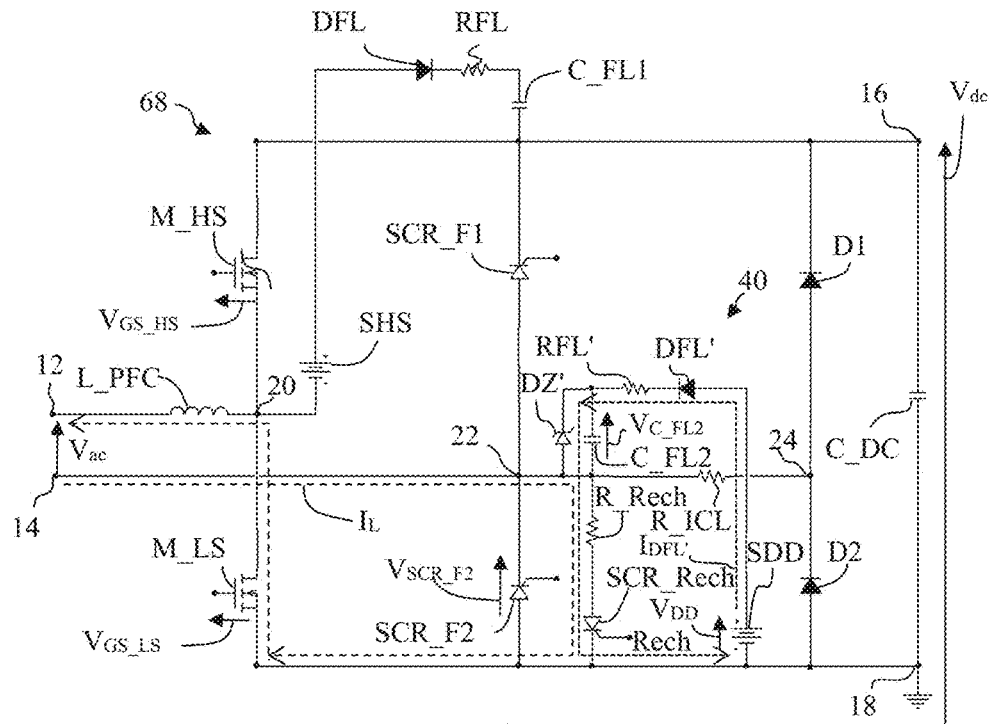
FIG. 19 partially and schematically shows another embodiment of a so-called "totem pole" AC-DC power factor correction converter.

FIG. 19 is a figure similar to FIG. 14 of another embodiment of a so-called "totem-pole" AC-DC power factor correction converter 68. Converter 68 comprises all the elements of the converter 66 shown in FIG. 14 and further comprises, connected between node 22 and terminal 18, a resistor R_Rech in series with a thyristor SCR_Rech. Thyristor SCR_Rech is a cathode-gate thyristor, having its cathode connected to terminal 18, and having its gate controlled by a signal Rech. As a variant, thyristor SCR_Rech may be replaced with any other switch capable of blocking an AC voltage having a peak-to-peak amplitude corresponding to that of the mains voltage, for example, at least 400 V peak-to-peak. As an example, thyristor SCR_Rech may be replaced with a MOS transistor and a diode in series with its drain.

Figure 20:
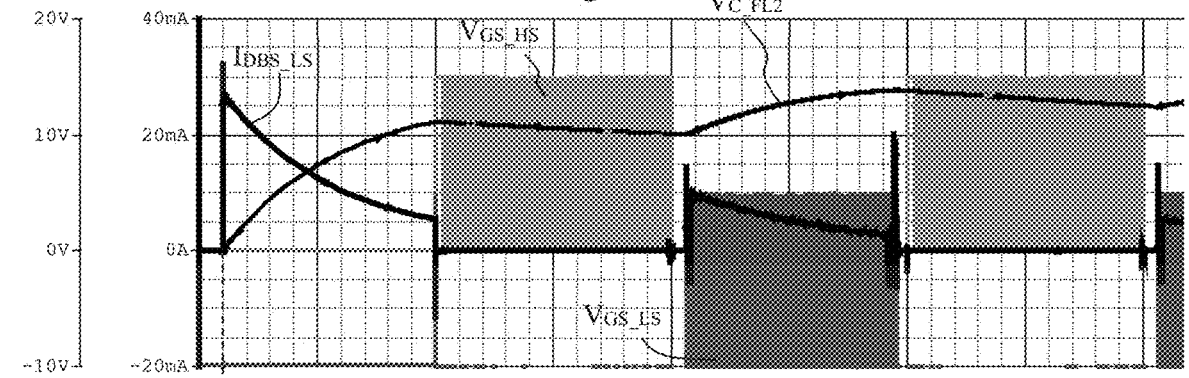
FIG. 20 shows timing diagrams of voltages and of currents of the circuit of FIG. 19 according to an embodiment of the converter operation.
Figure 20:
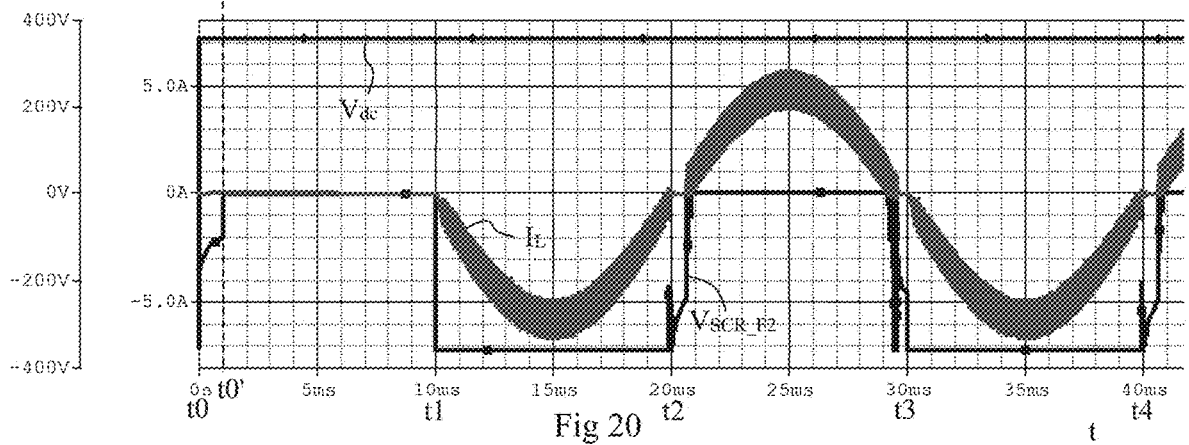

FIG. 20 is a figure similar to FIG. 15, with the difference that here, capacitor C_DC is initially charged at time t0, and shows timing diagrams of the voltages $V_{C\_FL2}$, $V_{GS\_HS}$, $V_{GS\_LS}$, $V_{dc}$, and $V_{SCR\_F2}$ and of the currents $I_L$ and $I_{DFL'}$ of circuit 68 during a first charge followed by the steady-state operation for an embodiment of the operating method of the circuit 68 of FIG. 19. In FIG. 20, the first charge of capacitor C_FL2 is ensured by thyristor SCR_Rech, which is then turned on between times t0' (time of the turn-on control of thyristor SCR_Rech) and t1. Indeed, since here voltage $V_{dc}$ is high, no current flows through resistor R_ICL, which does not allow a recharge of C_FL2 if thyristor SCR_F2 is not made conductive, which may for example occur during standby phases of the circuit. The recharge of C_FL2 is ensured by thyristor SCR_F2, which is then turned on in steady state during each positive halfwave of voltage $V_{ac}$ as previously described. Thyristor SCR_Rech may optionally be turned off during each negative halfwave of voltage $V_{ac}$. This advantageously enables to obtain a better control of the voltage across capacitor C_FL2, for example in the case where the voltage across resistor R_ICL is too low or when the first charge is achieved when voltage $V_{dc}$ is already high.

Figure 21:
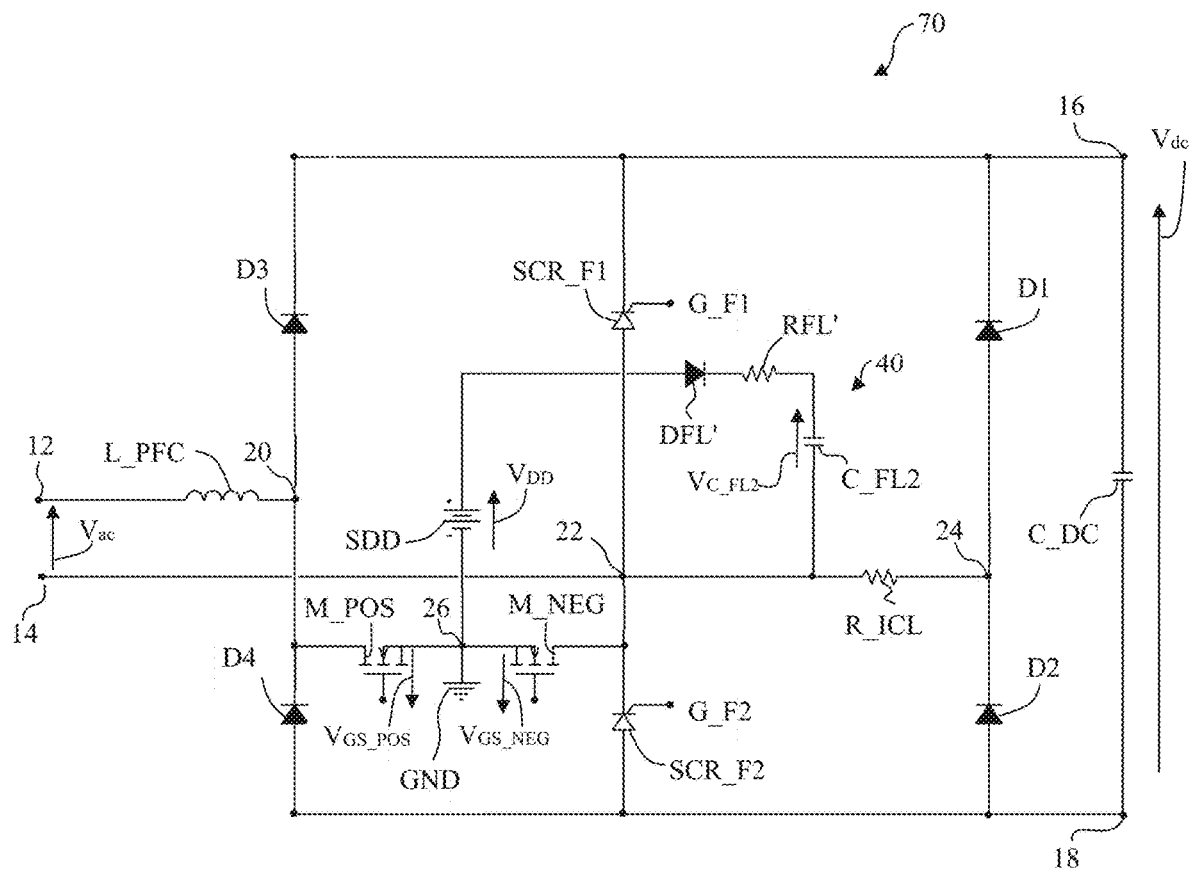
FIG. 21 partially and schematically shows an embodiment of an AC-DC power factor correction converter with an AC switch PFC.
Figure 21:
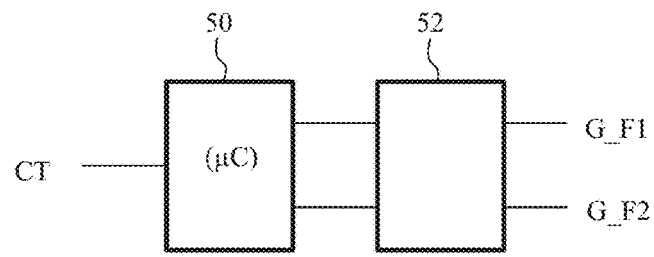

FIG. 21 schematically shows another embodiment of an AC-DC converter 70 with a power factor correction (PFC) using an bidirectional switch, circuit which is commonly called H-bridge PFC or AC switch PFC. Converter 70 is for example used to deliver the DC voltage of an on-board network of a motor vehicle. The elements common between converter 70 and the converter 67 shown in FIG. 18 are designated with the same reference numerals.

Two input terminals 12 and 14 are intended to receive an AC voltage $V_{ac}$, for example, the voltage of the electric distribution network (for example, 230 or 120 volts, 50 Hz or 60 Hz). The two output terminals 16 and 18 deliver DC voltage $V_{dc}$. Terminal 12 is coupled to a first terminal of inductive element L_PFC, having a second terminal coupled to the midpoint 20 of a series association of two diodes D3 and D4 between the two terminals 16 and 18. The anode of diode D4 is connected to terminal 18 and the cathode of diode D3 is connected to terminal 16.

Terminal 14 is connected to the midpoint 22 of the series association of the two thyristors SCR_F1 and SCR_F2 between terminals 16 and 18. The anode of thyristor SCR_F2 is connected to terminal 18 and the cathode of thyristor SCR_F1 is connected to terminal 16. In the embodiment of FIG. 21, thyristor SCR_F1 is a cathode-gate thyristor and thyristor SCR_F2 is a cathode-gate thyristor. The gate of thyristor SCR_F1 receives a control signal G_F1. The gate of thyristor SCR_F2 receives a control signal G_F2.

Resistor R_ICL connects midpoint 22 to the midpoint 24 of the series association of the two diodes D1 and D2 between terminals 16 and 18. The anode of diode D2 is connected to terminal 18 and the cathode of diode D1 is connected to terminal 16. Storage and smoothing capacitor C_DC connects terminal 18 to terminal 16.

Converter 70 further comprises a series association of two switches M_POS and M_NEG between the two midpoints 20 and 22. According to an embodiment, each switch M_POS, M_NEG corresponds to an enhancement mode MOS transistor, for example of type N. The drain of MOS transistor M_POS is coupled, preferably connected, to midpoint 20 and the source of MOS transistor M_POS is coupled, preferably connected, to a midpoint 26. Call $V_{GS\_POS}$ the voltage between the gate of transistor M_POS and midpoint 26. The drain of MOS transistor M_NEG is coupled, preferably connected, to midpoint 22 and the source of MOS transistor M_NEG is coupled, preferably connected, to midpoint 26. Call $V_{GS\_NEG}$ the voltage between the gate of transistor M_NEG and midpoint 26. Midpoint 26 defines a reference potential, typically ground GND.

Converter 70 further comprises power supply circuit SDD delivering reference voltage $V_{DD}$ and power supply circuit 40 delivering reference voltage $V_{C\_FL2}$ and comprising diode DFL', resistor RFL', and capacitor C_FL2. The negative terminal of source SDD is coupled, preferably connected, to midpoint 26. The positive terminal of source SDD is coupled, preferably connected, to the anode of diode DFL'. The cathode of diode DFL' is coupled, preferably connected, to a terminal of resistor RFL'. The other terminal of resistor RFL' is coupled, preferably connected, to a first electrode of capacitor C_FL2. The second electrode of capacitor C_FL2 is coupled, preferably connected, to midpoint 22. The positions of diode DFL' and of resistor RFL' may be inverted. In the present embodiment, power supply circuit 40 is used for the control of thyristor SCR_F2.

Further, a turn-on switch, not shown, may be interposed between terminals 12 and 14 on the one hand, and inductance L_PFC and midpoint 22 on the other hand.

Electronic circuit 50, for example, a microcontroller (µC), generates pulses for controlling the gates of thyristors SCR_F1 and SCR_F2. Microcontroller 50 controls the gates of thyristors SCR_F1 and SCR_F2 via one or two insulated optical, magnetic, or capacitive technology couplers 52 powered by power supply circuit 40 for the control of the gate of thyristor SCR_F2 and by another power supply circuit, not shown, for the control of the gate of thyristor SCR_F1, which may be identical to the circuit 30 shown in FIG. 8. Microcontroller 50 receives difference set points CT or measurements to close thyristors SCR_F1 and SCR_F2 at the right times for the fullwave control in steady state. MOS transistors M_POS and M_NEG are controlled by a control circuit, not shown, or by microcontroller 50.

According to an embodiment, at least in steady state, transistor M_POS is controlled, particularly by pulse width modulation (PWM), to be conductive during each positive halfwave and transistor M_NEG is controlled, particularly by PWM, to be conductive during each negative halfwave. In steady state, during each positive halfwave of voltage $V_{ac}$, when transistor M_POS is controlled to be conductive, inductance L_PFC is coupled between terminals 12 and 14, by transistor M_POS, turned on, and by the intrinsic diode of transistor M_NEG or through its channel if voltage $V_{GS\_NEG}$ is sufficiently biased to make this channel conductive, and sees voltage $V_{ac}$. A current increases in inductance L_PFC, which stores power. When transistor M_POS is controlled to be non-conductive, inductance L_PFC releases the power stored in capacitor C_DC by diode D3 and thyristor SCR_F2. During each negative halfwave of voltage $V_{ac}$, when transistor M_NEG is controlled to be conductive, inductance L_PFC is coupled between terminals 12 and 14, by transistor M_NEG, turned on, and by the intrinsic diode of transistor M_POS or through its channel if voltage $V_{GS\_POS}$ is sufficiently biased to make this channel conductive, and sees voltage $V_{ac}$. A current increases in inductance L_PFC, which stores power. When transistor MOS M_NEG is controlled to be non-conductive, inductance L_PFC releases the power stored in capacitor C_DC by diode D4 and thyristor SCR_F1. Preferably, transistors M_POS and M_NEG are simultaneously controlled. This enables to decrease the resistance of each transistor M_POS and M_NEG when their intrinsic diode is conductive.

In steady state, thyristor SCR_F1 is made conductive, possibly intermittently, during each negative halfwave and thyristor SCR_F2 is made conductive, possibly intermittently, during each positive halfwave.

In the following description, call $V_{M\_NEG}$ the voltage between the drain and the source of transistor M_NEG, $I_{M\_NEG}$ the current flowing from the drain to the source of transistor M_NEG, $I_{M\_POS}$ the current flowing from the drain to the source of transistor M_POS, $I_{D3}$ the current flowing from the anode to the cathode of diode D3, $V_{D3}$ the voltage between the cathode and the anode of diode D3, $I_{SCR\_F1}$ the current flowing through thyristor SCR_F1, and $I_{SCR\_F2}$ the current flowing through thyristor SCR_F2.

The operation of circuit 70 will now be described in further detail.

Figure 22:
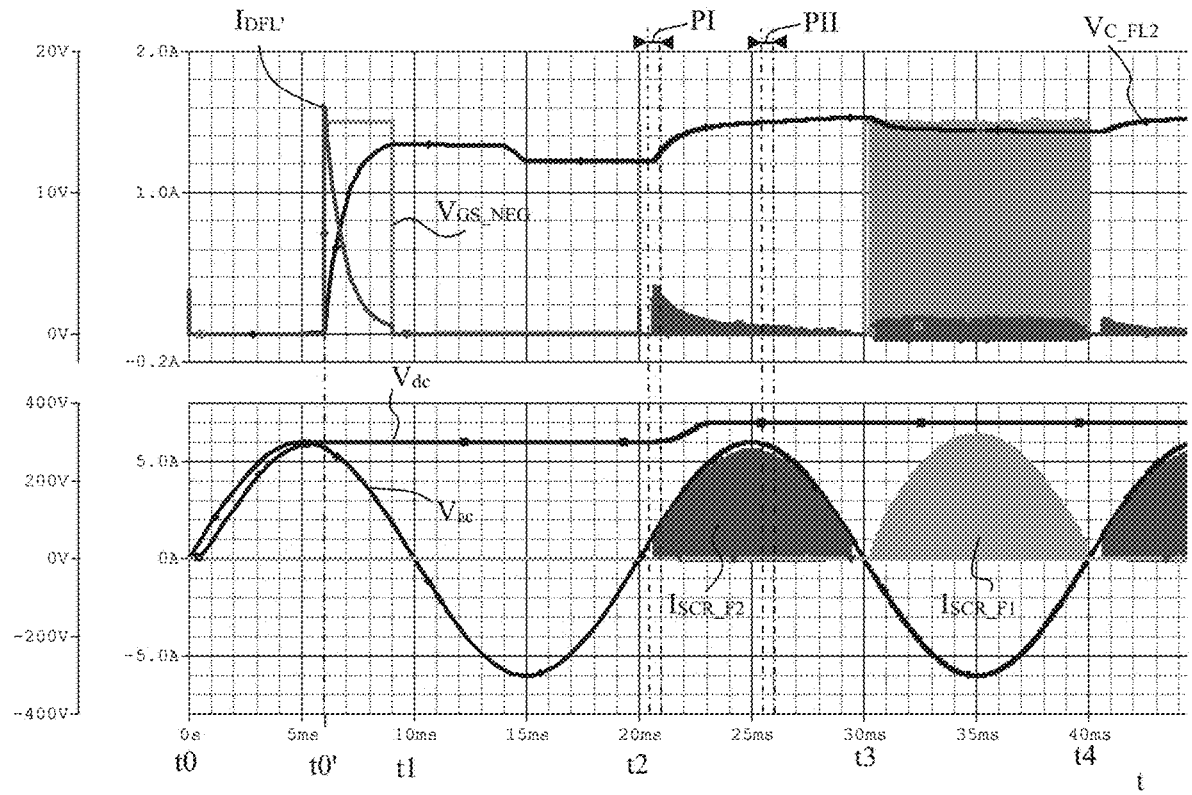
FIG. 22 shows timing diagrams of voltages and of currents of the converter of FIG. 21 according to an embodiment of the converter operation.

FIG. 22 shows timing diagrams of the voltages $V_{C\_FL2}$, $V_{GS\_NEG}$, $V_{dc}$, and $V_{ac}$ and of the currents $I_{DFL'}$, $I_{SCR\_F2}$ and $I_{SCR\_F1}$ of circuit 70 during a first charge followed by the operation in steady state for an embodiment of the operating method of the circuit 70 of FIG. 21. In FIG. 22, times t0, t0', t1, t2, t3, and t4 are successive. Voltage $V_{ac}$, not shown in FIG. 2, has positive halfwaves between times t0 and t1 and times t2 and t3, and negative halfwaves between times t1 and t2 and times t3 and t4. The steady-state operation substantially starts at time t2. Between times t0 and t1, capacitor C_DC is precharged by the first positive halfwave of voltage $V_{ac}$ through diodes D3 and D2 and resistor R_ICL. Certain timing diagrams of FIG. 22 are shown in enlarged views for the durations PI and PII of the steady state respectively in FIGS. 24 and 26.

Figure 23:
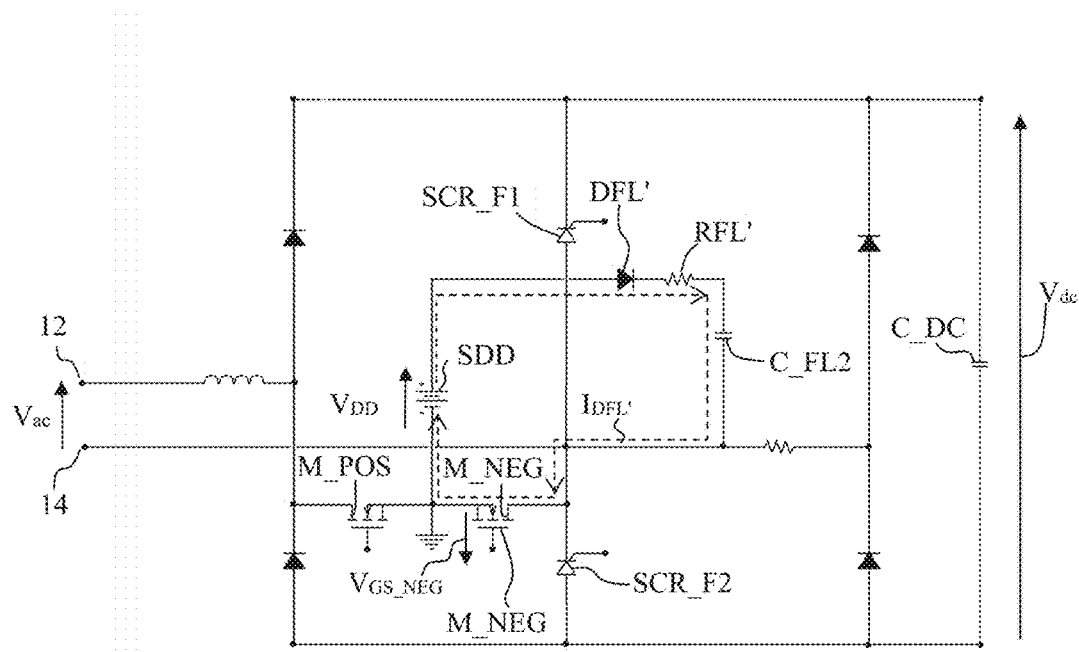
FIG. 23 illustrates the flowing of currents through the converter of FIG. 21 in an operating phase.

FIG. 23 is a figure similar to FIG. 21 illustrating the flowing of current $I_{DFL'}$ through converter 70 during the first charge of capacitor C_FL2 between times t0 and t1. During times t0 and t1, transistor M_POS is controlled not to be conductive. At time t0, transistor M_NEG is controlled not to be conductive. When source SDD is activated and when voltage $V_{DD\_HS}$ is stabilized, transistor M_NEG is controlled at time t0', between times t0 and t1, to be conductive during a portion of the rest of the positive halfwave of voltage $V_{ac}$. Capacitor C_FL2 is then charged by the current $I_{DFL'}$ due to voltage $V_{DD\_HS}$ and flowing through diode DFL', resistor RFL', and transistor M_NEG. Current $I_{DFL'}$ increases from 0 A, transits through a maximum, and then decreases down to 0 A. Voltage $V_{C\_FL2}$ rises up to a maximum and then slowly decreases.

Figure 24:
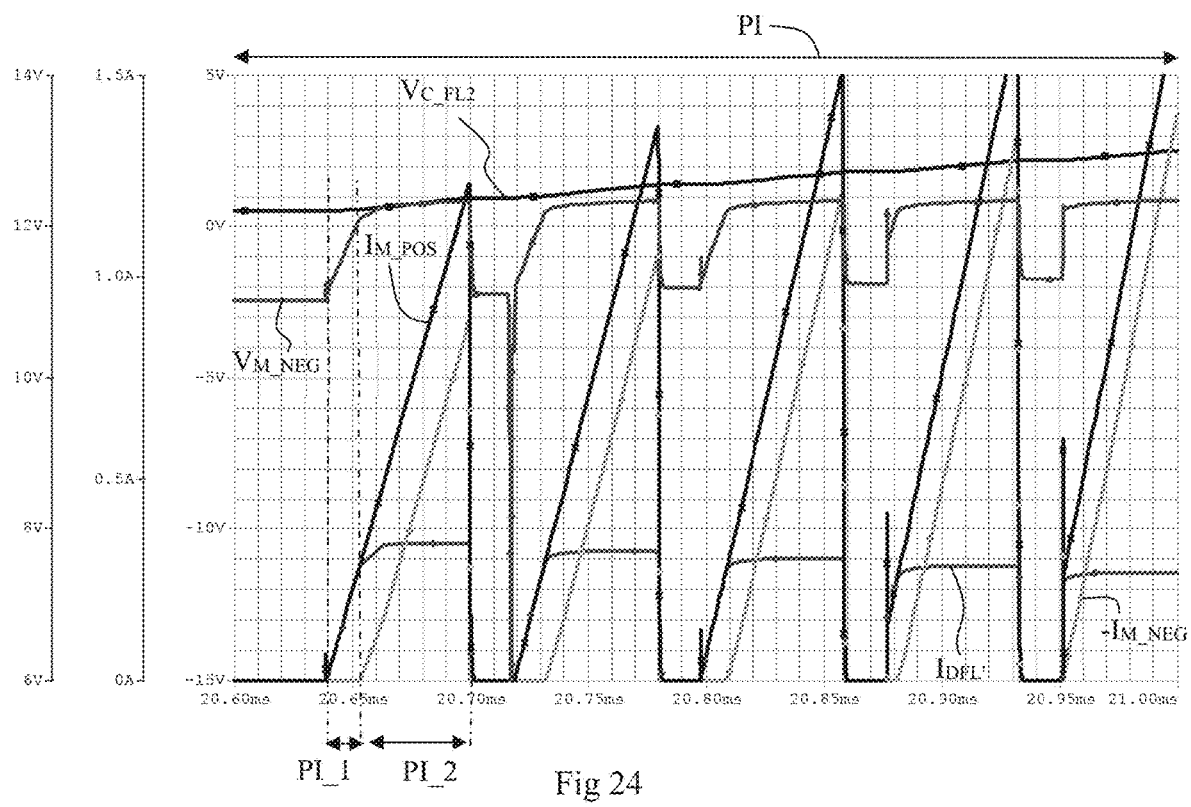
FIG. 24 shows a detail view of timing diagrams of FIG. 22.

FIG. 24 is a detail view of timing diagrams of voltage $V_{C\_FL2}$, and of the current $I_{DFL'}$ of FIG. 22, for duration PI, and of timing diagrams of the source-drain $V_{M\_NEG}$ of transistor M_NEG and of currents $I_{M\_POS}$ and of the opposite of current $I_{M\_NEG}$, noted $-I_{M\_NEG}$. Duration PI starts little after time t2, at the beginning of a positive halfwave of voltage $V_{ac}$ in steady state. On the axis of ordinates, the scale varying from 6 V to 14 V applies to voltage $V_{C\_FL2}$ and the scale varying from −15 V to 5 V applies to voltage $V_{M\_NEG}$.

In steady state, thyristor SCR_F2 is made intermittently conductive during each positive halfwave of voltage $V_{ac}$ and is made non-conductive during each negative halfwave of voltage $V_{ac}$. Thyristor SCR_F1 is made non-conductive during each positive halfwave of voltage $V_{ac}$ and is made intermittently conductive during each negative halfwave of voltage $V_{ac}$.

Figure 25:
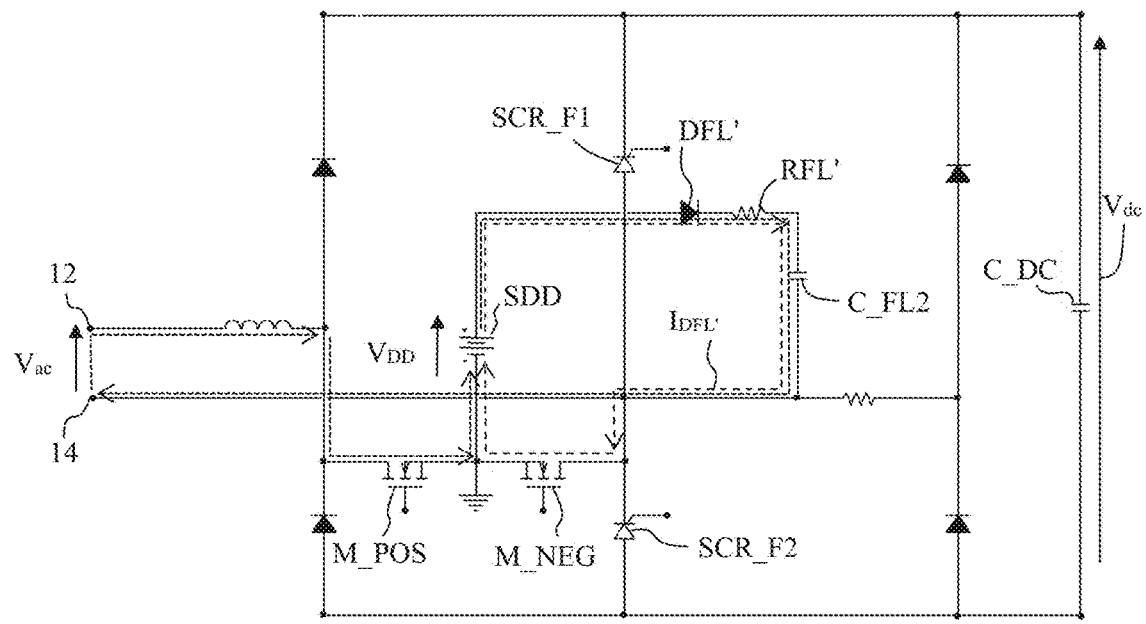
FIG. 25 illustrates the flowing of currents through the converter of FIG. 21 in an operating phase.

FIG. 25 is a figure similar to FIG. 21 illustrating the flowing of current $I_{DFL'}$ through the converter 70 of FIG. 21, for duration PI, for an embodiment of the operating method of converter 70.

Transistor M_NEG is controlled by PWM during each negative halfwave of voltage $V_{ac}$ (voltage $V_{GS\_NEG}$ alternating between approximately 15 V and 0 V) and shown as being made non-conductive (voltage $V_{GS\_NEG}$ then being approximately equal to 0 V) during each positive halfwave of voltage $V_{ac}$ to simplify the timing diagrams, even though, in practice, transistor M_NEG is preferably controlled simultaneously to transistor M_POS during each positive halfwave. Further, transistor M_POS is controlled by PWM during each positive halfwave of voltage $V_{ac}$ and is made non-conductive during each negative halfwave of voltage $V_{ac}$, even though, in practice, it is preferably controlled simultaneously to transistor M_NEG during each negative halfwave.

In steady state, the recharge of capacitor C_FL2 is performed, during each positive halfwave of voltage $V_{ac}$, during each phase during which transistor M_POS is controlled to be conductive. When transistor M_POS is controlled to be conductive, the source-drain voltage $V_{M\_NEG}$ of transistor M_NEG increases from a negative value, substantially equal to the difference between voltages $V_{DD\_HS}$ and $V_{C\_FL2}$, to a value close to zero, at most precisely +0.6 V necessary to make the intrinsic diode of MOS transistor M_NEG conductive when its voltage $V_{GS\_NEG}$ remains at the low level.

At the beginning of each positive halfwave of voltage $V_{ac}$, particularly for the duration PI of FIG. 22 and shown in FIG. 24, each phase during which transistor M_POS is controlled to be conductive exhibits a succession of two sub-phases PI_1 and PI_2. During sub-phase PI_1, as long as voltage $V_{M\_NEG}$ remains smaller than +0.6 V, the charge of capacitor C_FL2 is mainly achieved by the flowing of the current $I_{DFL'}$ due to the voltage $V_{DD\_HS}$ through diode DFL', resistor RFL', inductance L_PFC, voltage $V_{ac}$, and transistor M_POS, which is illustrated by the dotted line in FIG. 25. When voltage $V_{M\_NEG}$ becomes greater than approximately +0.6 V, during sub-phase PI_2, the charge of capacitor C_FL2 is achieved by the flowing of the current $I_{DFL'}$ due to voltage $V_{DD\_HS}$ through diode DFL', resistor RFL', and the intrinsic diode of transistor M_NEG, which is illustrated by the dashed line in FIG. 25, that is, in the same way as previously described in relation with FIG. 23.

Figure 26:
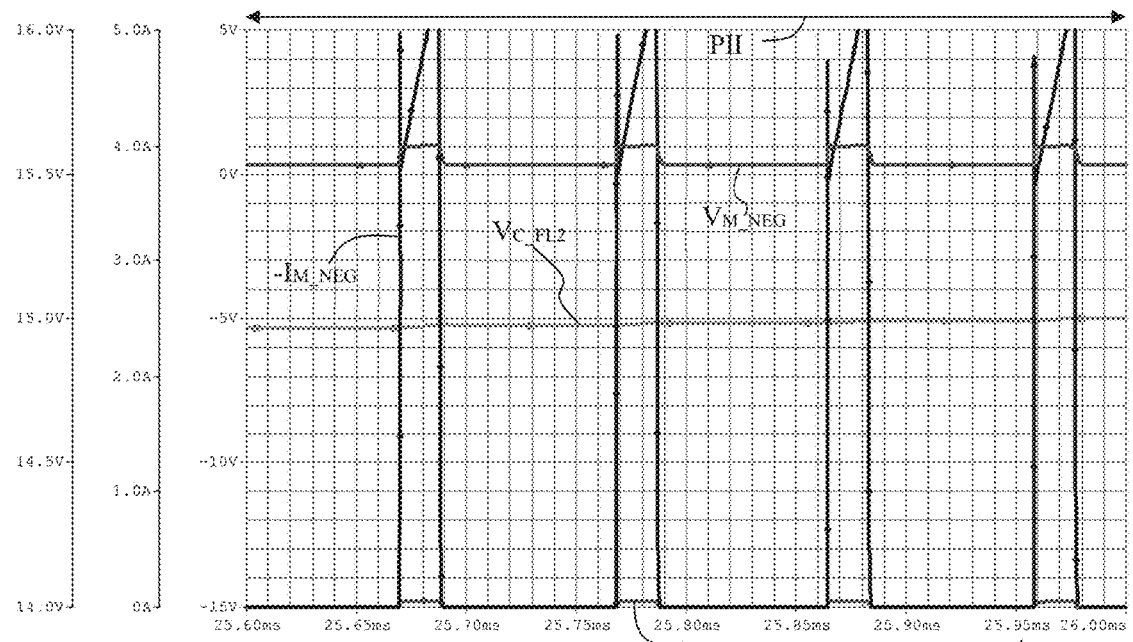
FIG. 26 shows a detail view of timing diagrams of FIG. 22.

FIG. 26 is a detail view of timing diagrams of voltage $V_{C\_FL2}$, and of the current $I_{DFL}$, of FIG. 22, for duration PII, subsequent to duration PI, and of timing diagrams of the source-drain $V_{M\_NEG}$ of transistor M_NEG and of the opposite of current $I_{M\_NEG}$, noted $-I_{M\_NEG}$. On the axis of ordinates, the scale varying from 14 V to 16 V applies to voltage $V_{C\_FL2}$ and the scale varying from −15 V to 5 V applies to voltage $V_{M\_NEG}$. The intrinsic diode of transistor M_NEG becomes conductive as soon as transistor M_POS is controlled to be conductive, the charge of capacitor C_FL2 is achieved by the flowing of the current $I_{DFL}$, due to the voltage $V_{DD\_HS}$ through diode DFL', resistor RFL', and transistor M_NEG, which is illustrated by the dashed line in FIG. 25.

In the embodiment previously described in relation with FIG. 21, thyristor SCR_F2 is a cathode-gate thyristor and thyristor SCR_F1 is a cathode-gate thyristor. However, it may be desirable for thyristors SCR_F1 and SCR_F2 to be selected so that their control signals are referenced to the same point similarly to the solution disclosed in FIG. 18.

Figure 27:
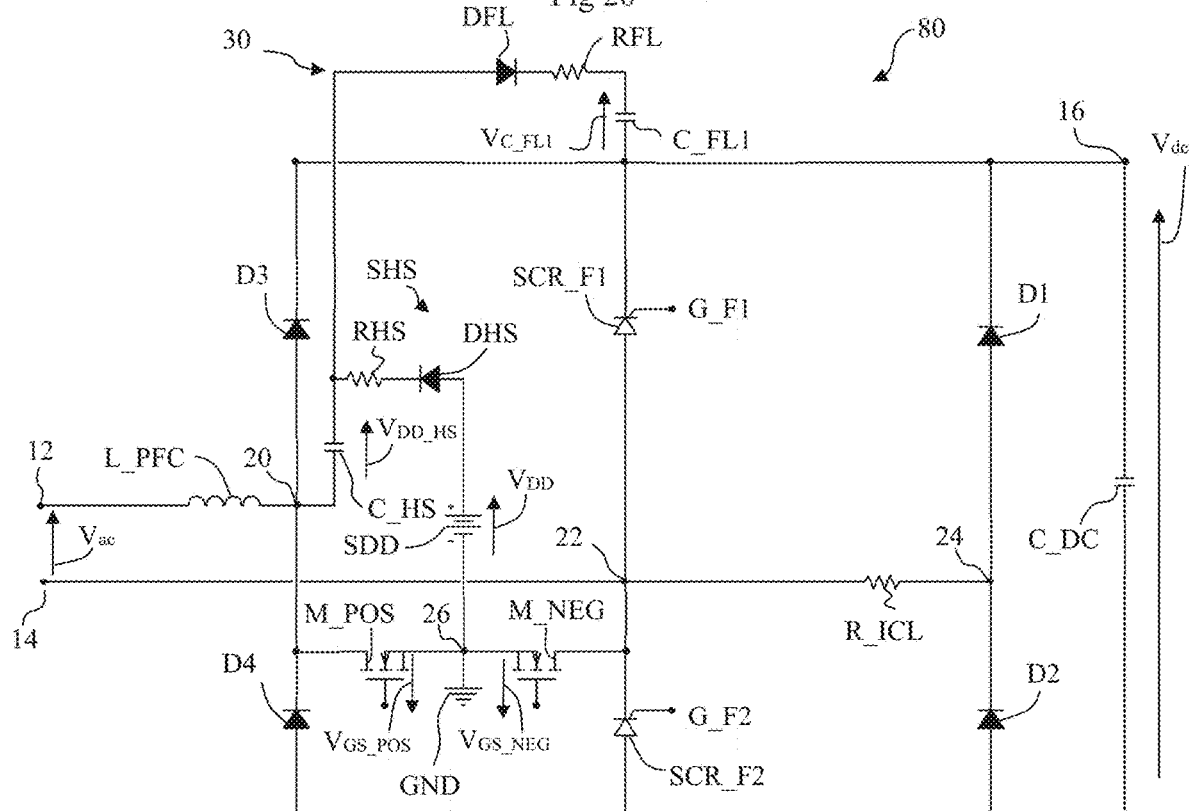
FIG. 27 partially and schematically shows another embodiment of an AC-DC power factor correction converter with an AC switch PFC.

FIG. 27 schematically shows another embodiment of an AC-DC converter 80 with a AC switch PFC and a power factor correction. Converter 80 comprises all the elements of the converter 70 shown in FIG. 21, with the difference that it comprises power supply circuit 30, previously-described in relation with FIG. 1, for the control of thyristor SCR_F1. According to an embodiment, source SHS comprises a capacitor C_HS, a diode DHS, a resistor RHS, and is coupled to a source SDD of a reference voltage $V_{DD}$. A first electrode of capacitor C_HS is coupled, preferably connected, to midpoint 20. The second electrode of capacitor C_HS is coupled, preferably connected, to the anode of diode DFL. The cathode of diode DFL is coupled, preferably connected, to a terminal of resistor RFL. The other terminal of resistor RFL is coupled, preferably connected, to an electrode of capacitor C_FL1. The other electrode of capacitor C_FL1 is coupled, preferably connected, to terminal 16. The positions of diode DFL and resistor RFL may be inverted. Resistor RFL, which is used as a current limiter, may be absent, but it preferably present. The anode of diode DHS is coupled, preferably connected, to the positive terminal of source SDD. The cathode of diode DHS is coupled, preferably connected, to a terminal of resistor RHS. The other terminal of resistor RHS is coupled, preferably connected, to the anode of diode DLF and to the second electrode of capacitor C_HS. The positions of diode DHS and of resistor RHS may be inverted. Resistor RHS, which is used as a current limiter, may be absent, but is preferably present. Call $V_{GS\_POS}$ the voltage between the gate of transistor M_POS and midpoint 26. The drain of transistor MOS M_NEG is coupled, preferably connected, to midpoint 22 and the source of transistor MOS M_NEG is coupled, preferably connected, to midpoint 26. Call $I_{DHS}$ the current flowing through diode DHS.

Figure 28:
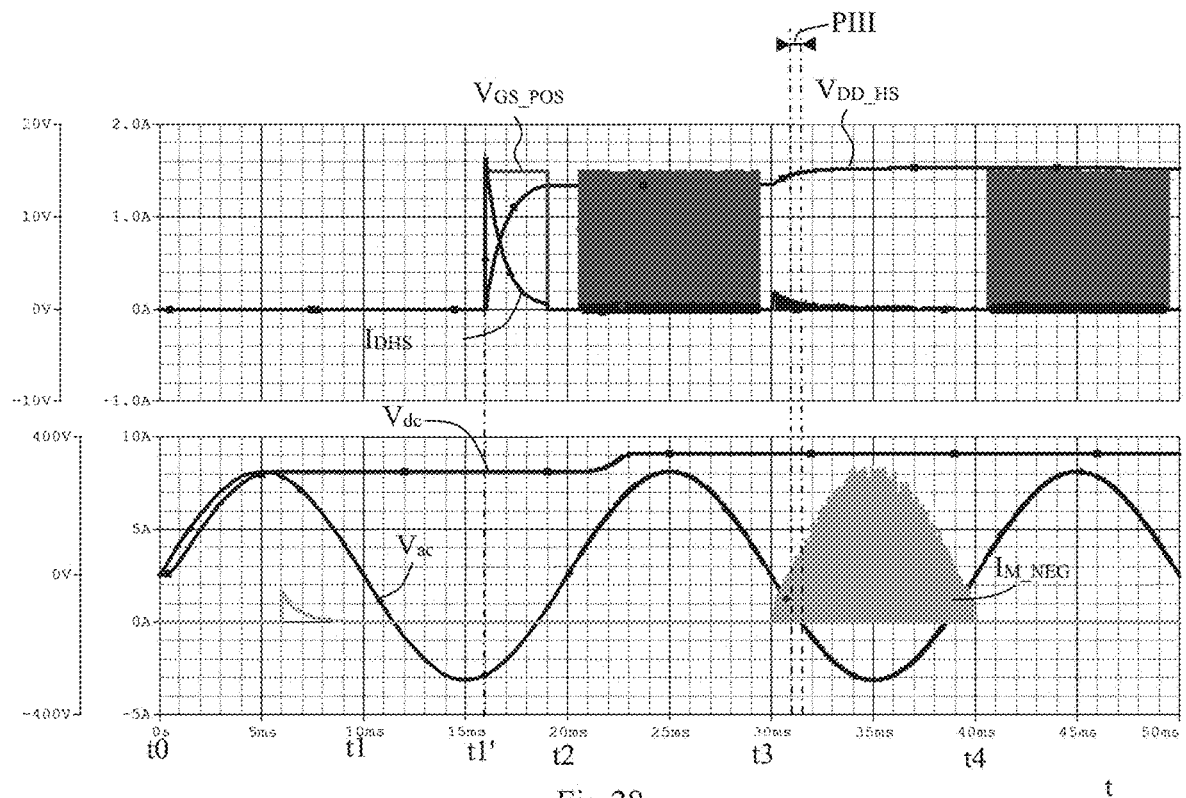
FIG. 28 shows timing diagrams of voltages and of currents of the converter of FIG. 27 according to an embodiment of the converter operation.

FIG. 28 is a figure similar to FIG. 22 and shows timing diagrams of the voltages $V_{DD\_HS}$, $V_{GS\_POS}$, $V_{dc}$, and $V_{ac}$ and of the currents $I_{DHS}$, and $I_{M\_NEG}$ of circuit 80 during the first charge followed by the steady-state operation for an embodiment of the operating method of the circuit 80 of FIG. 27. Certain timing diagrams of FIG. 28 are shown in an enlarged view for a duration PIII of the steady state in FIG. 30.

Figure 29:
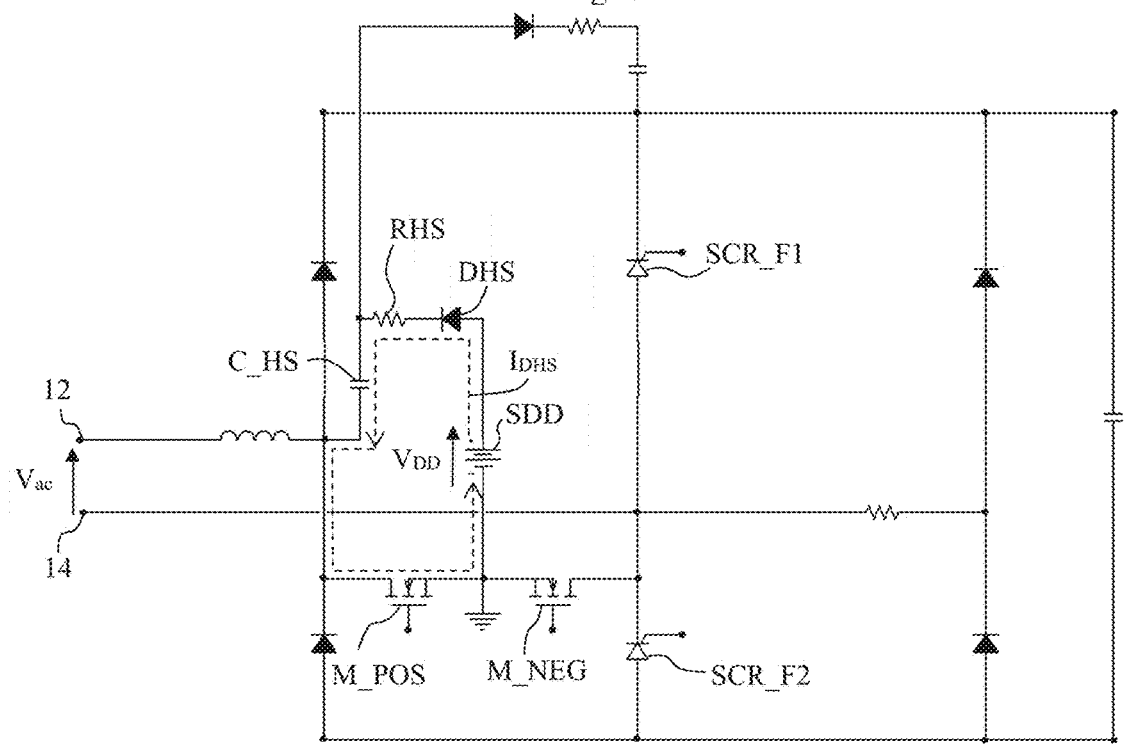
FIG. 29 illustrates the flowing of currents through the converter of FIG. 27 in an operating phase.

FIG. 29 is a figure similar to FIG. 27 illustrating the flowing of current $I_{DHS}$ in converter 80 during the first charge of capacitor C_HS between times t1 and t2 of FIG. 28, that is, during a negative halfwave of voltage $V_{ac}$ before the steady state. During positive halfwaves, in steady state, transistor M_POS is controlled to be forward-conducting. During negative halfwaves, it conducts in reverse from its source to its drain, which may be performed through its intrinsic diode if it is not controlled. When source SDD is activated and voltage $V_{DD}$ is stabilized, transistor M_POS is controlled at time t1', between terminals t1 and t2, to be conductive during a portion of the rest of the negative halfwave of voltage $V_{ac}$. Capacitor C_HS is then loaded by the current $I_{DHS}$ due to voltage $V_{DD}$ and flowing through diode DHS, resistor RHS, and transistor M_POS. Current $I_{DHS}$ increases from 0 A, transits through a maximum, and then decreases to 0 A. Voltage $V_{C\_HS}$ rises up to a maximum.

In steady state, the recharge of capacitor C_F is performed, during each negative halfwave of voltage $V_{ac}$, during each phase during which transistor M_NEG is controlled to be conductive and transistor M_POS becomes reverse-conducting either through its intrinsic diode, or through its channel when it is turned on by its control signal.

Figure 30:
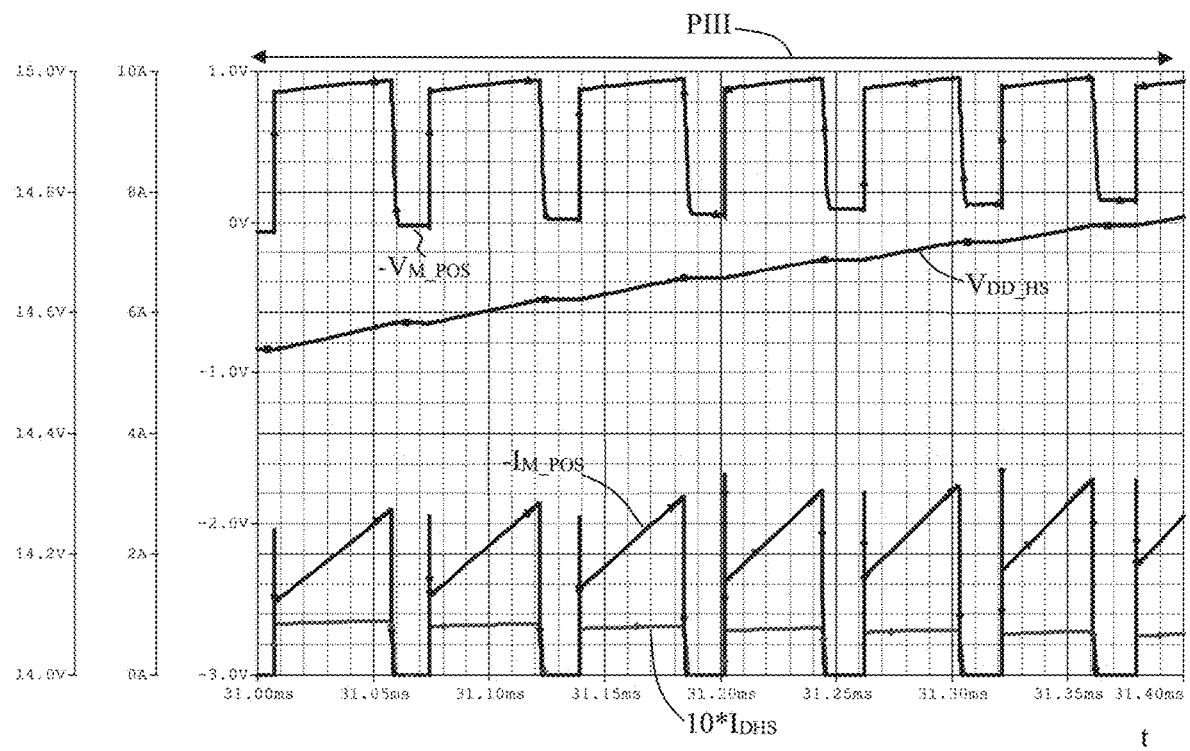
FIG. 30 shows a detail view of timing diagrams of FIG. 28.

FIG. 30 is a detail view of the timing diagrams of the voltage $V_{DD\_HS}$, and of the current $I_{DHS}$ (multiplied by a factor 10) of FIG. 28, for duration PIII, and of timing diagrams of the opposite of the drain-source voltage $V_{M\_POS}$ of transistor M_POS, noted $-V_{M\_POS}$, and of the opposite of current $I_{M\_POS}$, noted $-I_{M\_POS}$. On the axis of ordinates, the scale varying from 14 V to 15 V applies to voltage $V_{DD\_HS}$ and the scale varying from −3 V to 1 V applies to voltage $-V_{M\_POS}$. The intrinsic diode of transistor M_POS becomes conductive as soon as transistor M_NEG is controlled to be conductive. The charge of capacitor C_HS is achieved by the flowing of the current $I_{DHS}$ due to voltage $V_{DD}$ and flowing through diode DHS, resistor RHS, and the intrinsic diode of transistor M_POS or its channel if its gate is controlled, as illustrated in FIG. 28.

Figure 31:
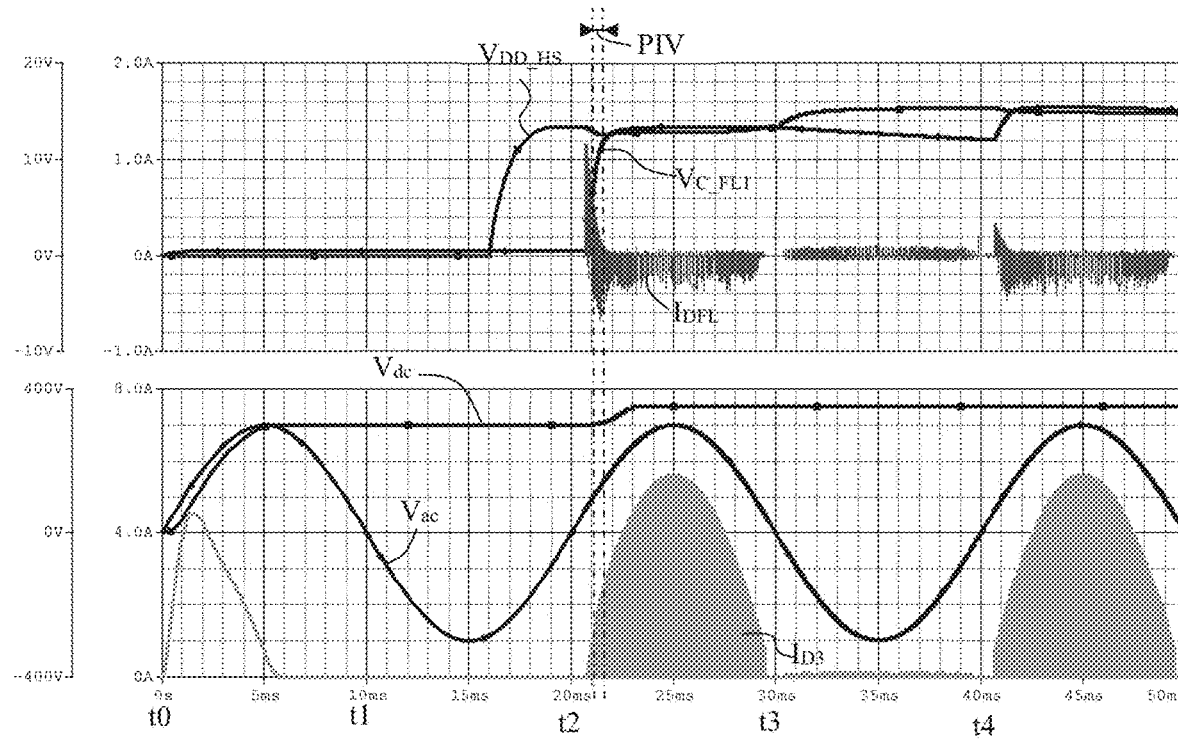
FIG. 31 shows timing diagrams of voltages and of currents of the converter of FIG. 27 according to an embodiment of the converter operation.

FIG. 31 is a figure similar to FIG. 28 and shows timing diagrams of the voltages $V_{DD\_HS}$, $V_{C\_FL1}$, $V_{dc}$, and $V_{ac}$ of the currents Ion, and $I_{D3}$ of circuit 80 during the first charge followed by the steady-state operation for an embodiment of the operating method of the circuit 80 of FIG. 27. Certain timing diagrams of FIG. 31 are shown in an enlarged view in FIG. 32 for a duration PIV of the steady state.

Figure 32:
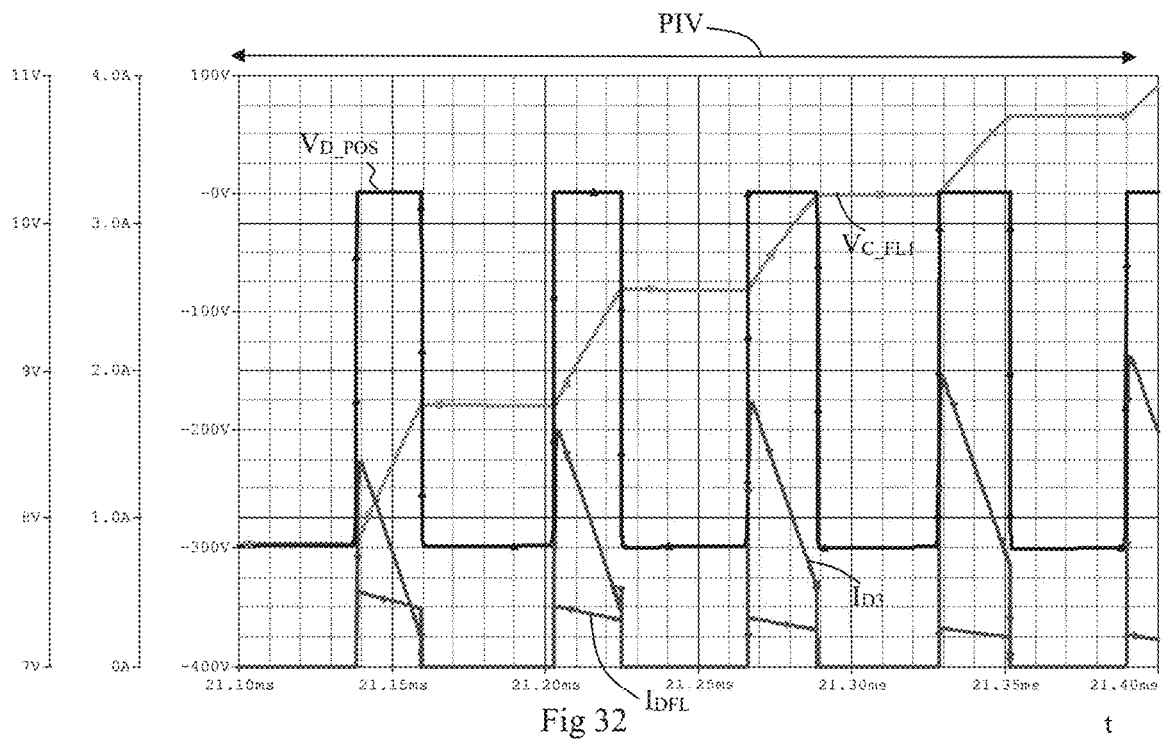
FIG. 32 shows a detail view of timing diagrams of FIG. 31.

FIG. 32 is a detail view of the timing diagrams of the voltage $V_{C\_FL1}$, and of the currents $I_{DHS}$ and $I_{D3}$ of FIG. 31, for duration PIV, and of the timing diagram of voltage $V_{D3}$. On the axis of ordinates, the scale varying from 7 V to 11 V applies to voltage $V_{C\_FL1}$ and the scale varying from −400 V to 100 V applies to voltage $V_{D3}$.

Capacitor C_FL1 is charged at the first positive halfwave of voltage $V_{ac}$ in steady state and after capacitor C_HS has been charged.

Figure 33:
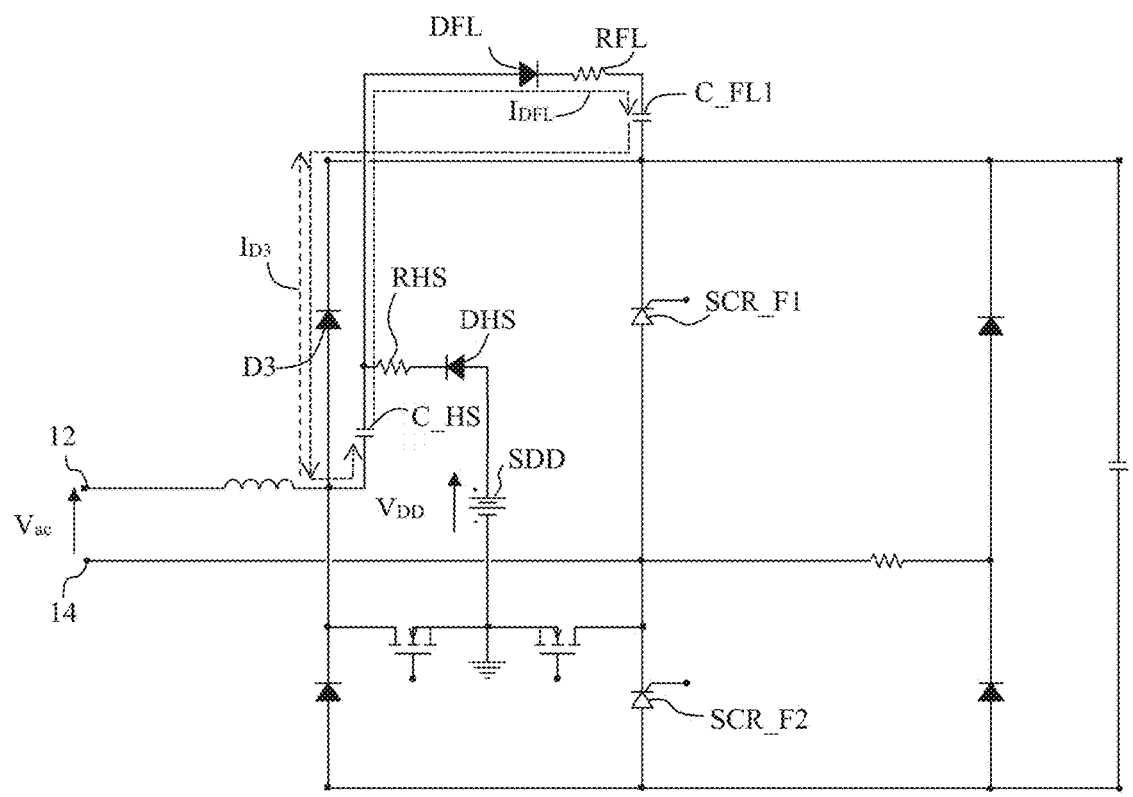
FIG. 33 illustrates the flowing of currents through the converter of FIG. 27 in an operating phase.

FIG. 33 is a figure similar to FIG. 27 illustrating the flowing of currents $I_{DFL}$ and $I_{D3}$ in converter 80 during the charge of capacitor C_FL1 after time t2 of FIG. 31, during a positive halfwave of voltage $V_{ac}$ in steady state. During each positive halfwave of voltage $V_{ac}$, when diode D3 becomes conductive, capacitor C_FL1 is charged by the current $I_{DFL}$ due to the voltage across capacitor C_HS and flowing through diode DFL, resistor RFL, and through diode D3 from its cathode to its anode. Current $I_{DFL}$ may cross diode D3 in the reverse direction since the latter conducts a total current $I_{D3}$ which remains positive from the anode to the cathode.

In the embodiment previously described in relation with FIG. 21, thyristor SCR_F2 is a cathode-gate thyristor and thyristor SCR_F1 is a cathode-gate thyristor. It may however be desirable for thyristor SCR_F2 to be selected with an anode gate so that its control signal is referenced to terminal 18 in the case where a control circuit of the converter is referenced to this point. Similarly, thyristor SCR_F1 may be selected to have an anode gate so that its gate control circuit is powered by circuit 40.

Figure 34:
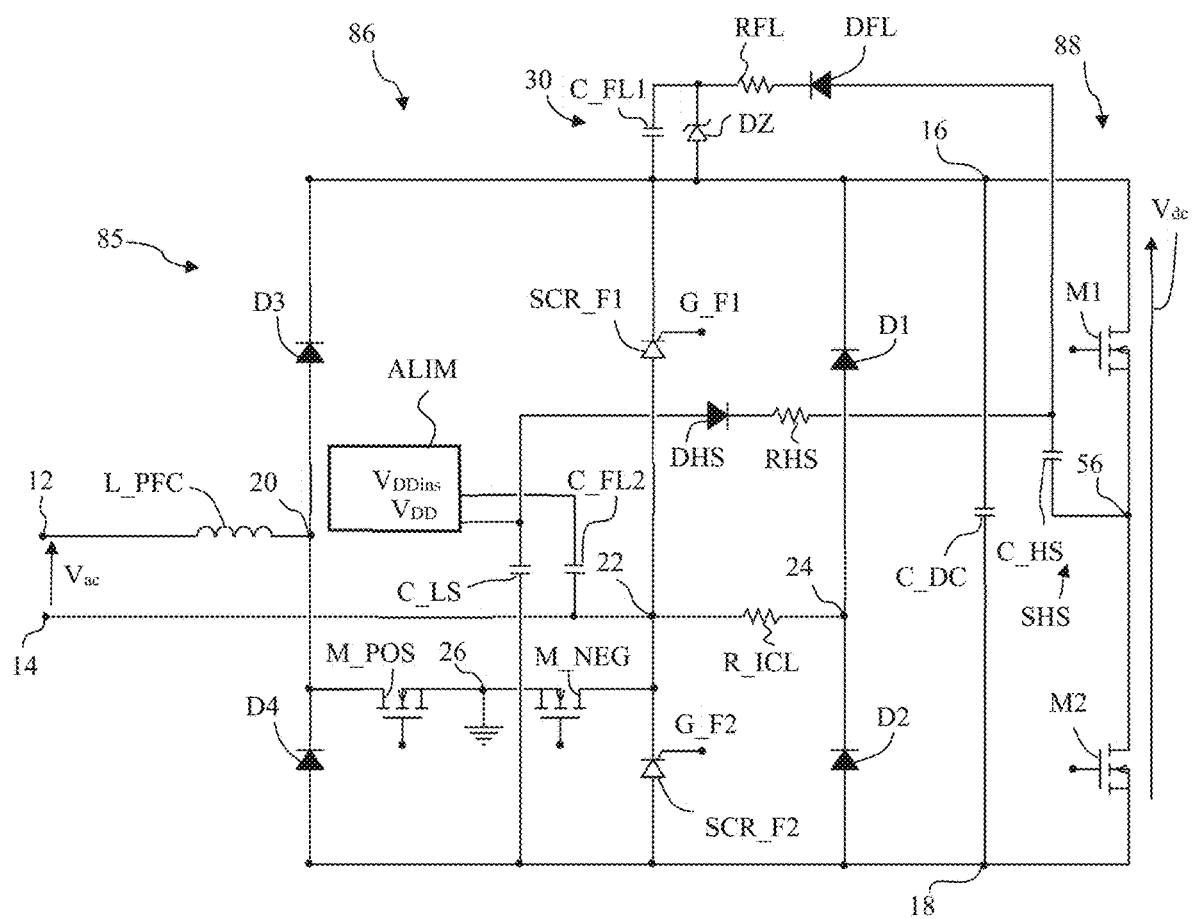
FIG. 34 partially and schematically shows another embodiment of an AC-DC converter with an AC switch PFC and with a power factor correction.

FIG. 34 partially and schematically shows an embodiment of a circuit 85 comprising an AC-DC converter with a AC switch PFC and a power factor correction coupled to another circuit 88, only partly shown in FIG. 34, for example, a DC/DC converter or a DC/AC converter. Converter 88 comprises a series association of the two switches M1 and M2 between the two terminals 16 and 18. Converter 86 comprises all the elements of converter 80, with the difference that the electrode of the capacitor C_HS of power supply circuit SHS which, for converter 80, is coupled to the midpoint 20 of the two diodes D3 and D4, is, for converter 86, coupled to the midpoint 56 of the two switches M1 and M2. According to an embodiment, each switch M1, M2 corresponds to an enhancement mode MOS transistor, for example, of type N. The drain of MOS transistor M1 is coupled, preferably connected to terminal 16 and the source of MOS transistor M1 is coupled to midpoint 56. The drain of MOS transistor M2 is coupled for example through an inductive element Lp and/or LT1 as shown in FIG. 12, or directly connected to midpoint 56, and the source of MOS transistor M2 is coupled, preferably connected, to terminal 18. In the present embodiment, power supply circuit SHS has the structure shown in FIG. 10.

Figure 35:
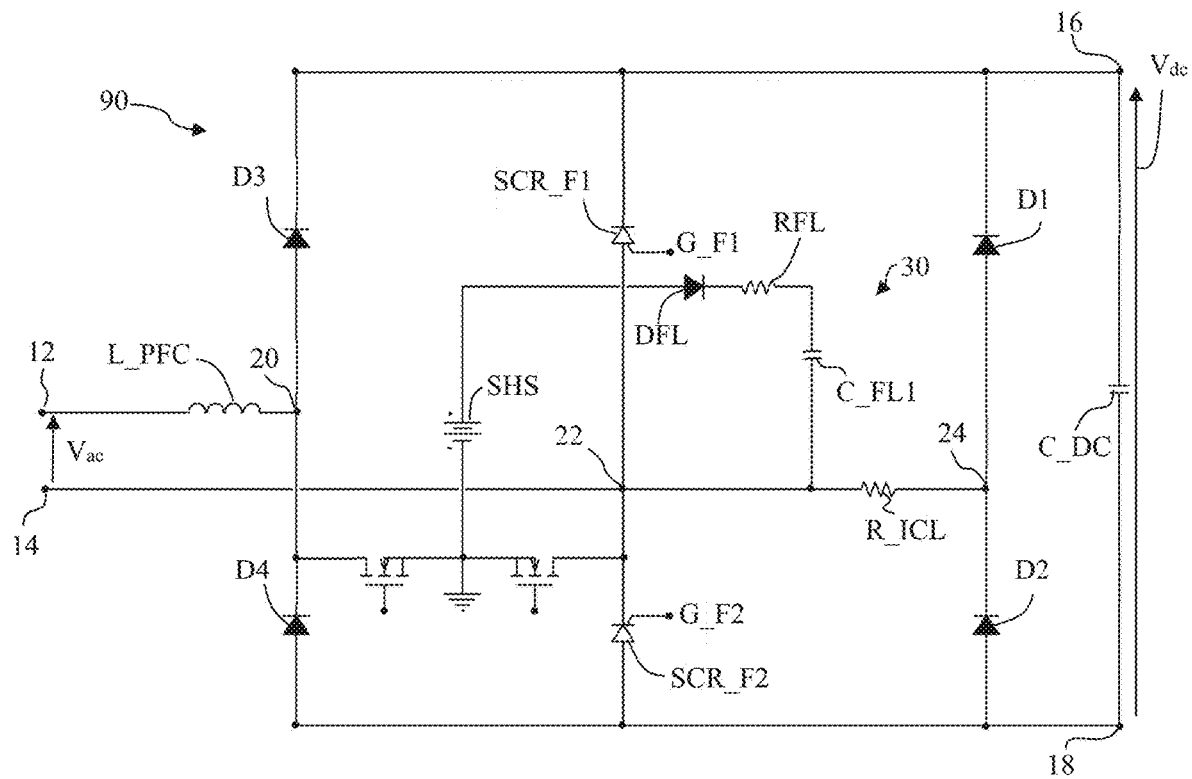
FIG. 35 partially and schematically shows another embodiment of AC-DC converter with an AC switch PFC and with a power factor correction.

FIG. 35 is a figure similar to FIG. 21 of another embodiment of an AC-DC converter 90 with a AC switch PFC and with a power factor correction. Converter 90 comprises all the elements of the converter 70 shown in FIG. 21, with the difference that thyristor SCR_F1 is an anode-gate thyristor. The structure of the gate of thyristor SCR_F1 is configured to allow a control of thyristor SCR_F1 by a positive gate current while an anode-gate thyristor is generally controlled by a negative gate current, that is, which is sunk from the gate. Thyristor SCR_F1 being an anode-gate thyristor, its control is thus referenced to midpoint 22. Thyristor SCR_F2 is a cathode-gate thyristor. Its control is thus referenced to the same midpoint 22. This embodiment advantageously enables to use power supply circuit 30 for thyristor SCR_F2 and also for thyristor SCR_F1.

Figure 36:
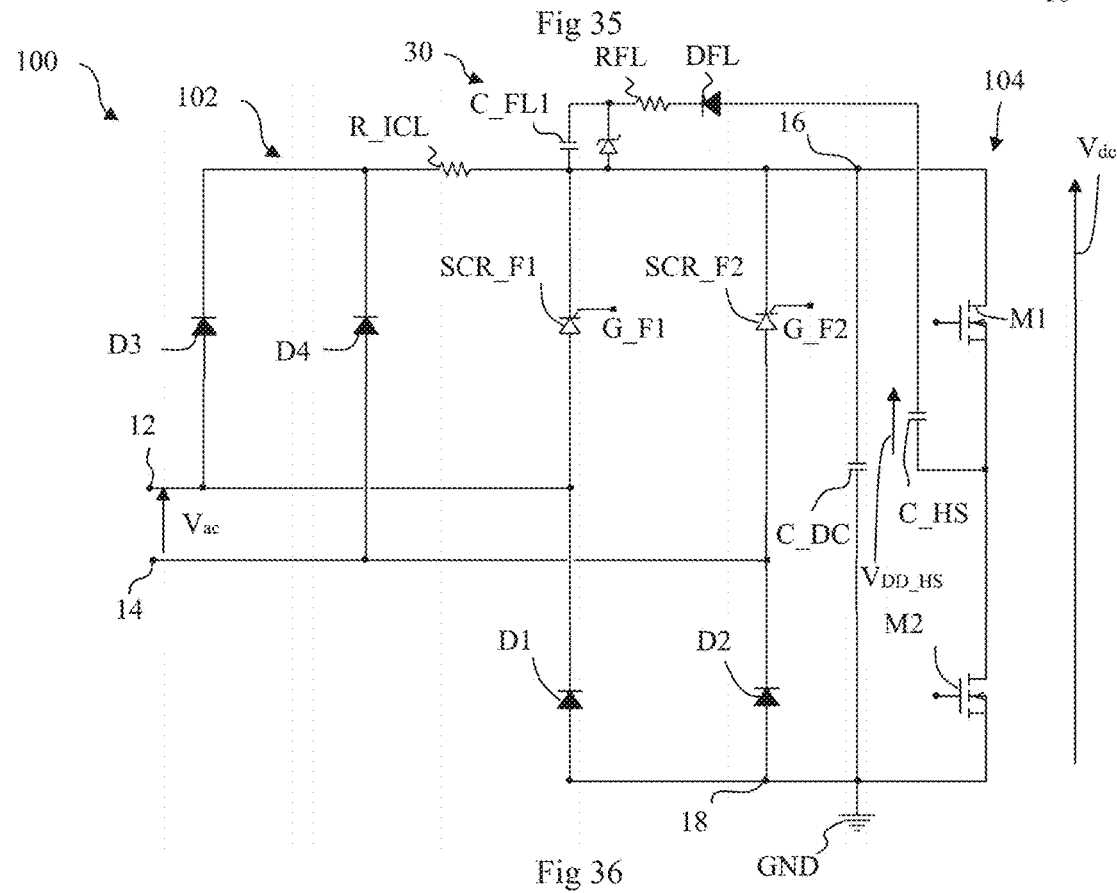
FIG. 36 partially and schematically shows an embodiment of a circuit comprising a mixed active bridge AC-DC converter.

FIG. 36 partially and schematically shows an embodiment of a circuit 100 comprising a mixed active bridge AC-DC converter 102 coupled to another circuit 104, only partly shown in FIG. 36, for example, a DC/DC converter or a DC/AC converter. Converter 104 comprises a series association of the two switches M1 and M2 between the two terminals 16 and 18.

AC-DC converter 102 comprises all the elements of the converter 62 shown in FIG. 8, with the difference that:
inductance L_PFC is not present;
the two thyristors SCR_F1 and SCR_F2 are cathode-gate thyristors and are arranged in anti-series between terminals 12 and 14, the anode of thyristor SCR_F2 being connected to terminal 14;
diode D1 is arranged in series with thyristor SCR_F1, the anode of diode D1 being connected to terminal 18 and the cathode of diode D1 being connected to the anode of thyristor SCR_F1, terminal 12 being connected to the midpoint between thyristor SCR_F1 and diode D1;
diode D2 is arranged in series with thyristor SCR_F2, the anode of diode D2 being connected to terminal 18 and the cathode of diode D2 being connected to the anode of thyristor SCR_F2, terminal 14 being connected to the midpoint between thyristor SCR_F2 and diode D2;
transistors M_HS and M_LS are not present, the AC-DC converter 100 comprising diodes D3 and D4, the anode of diode D3 being connected to terminal 12, the anode of diode D4 being connected to terminal 14, the cathode of diode D4 being connected to the cathode of diode D3; and
resistor R_ICL is connected between the cathode of diode D3 and terminal 16.

The two thyristors SCR_F2 and SCR_F1 are anode-gate thyristors powered by power supply circuit 30. As a variant, diodes D1 and D2 may be replaced with MOS transistors.

The first charges and the recharges of capacitors C_FL1 and C_HS of circuit 100 may be performed as previously described for circuit 60. In particular, capacitor C_FL1 is charged with power supply voltage $V_{DD\_HS}$ through resistor RFL and diode DFL. 11Capacitor C_HS may be charged from a power supply voltage $V_{DD}$, not shown in FIG. 33, as previously described.

The power supply circuits 30 and 40 of the converter according to the previously described embodiments advantageously have a simple structure and may be formed by circuits occupying a small surface area with respect to the total surface area of the converter. The power supply circuits 30 and 40 according to the previously-described embodiments may, advantageously, be formed by circuits having a low manufacturing cost.

Various embodiments and variants have been described. Those skilled in the art will understand that certain features of these various embodiments and variants may be combined, and other variants will occur to those skilled in the art. Finally, the practical implementation of the described embodiments and variations is within the abilities of those skilled in the art based on the functional indications given hereinabove. In particular, the programming of the microcontroller depends on the application and the described embodiments are compatible with usual applications using a microcontroller or the like to control a converter.

As a variant, resistor R_ICL and/or diode D1 and/or diode D2 may be suppressed. The precharge of capacitor C_DC can then be performed by phase variation control of thyristors SCR_F2 and SCR_F1 with a regularly decreasing turn-on delay to ensure a progressive charge of capacitor C_DC and the limiting of the inrush current at the powering on of converter 10.

In such an embodiment, thyristor SCR_F2 will preferably have an anode gate or a cathode gate and be controlled by means of an opto-Triac (as described in patent application FR20/09057) or any other solution within the abilities of those skilled in the art.

A converter may be summarized as including an AC-DC conversion stage (10; 60; 65; 66; 67; 68; 70; 80; 90; 100) including a first thyristor (SCR_F1; SCR_F2), a first power supply circuit (SHS; SDD) delivering a first reference voltage ($V_{DD\_HS}$; $V_{DD}$) between a first node (20; 26; 56; 18) and a second node, and a second power supply circuit (30; 40) delivering a second reference voltage ($V_{C\_FL1}$; $V_{C\_FL2}$) between third and fourth nodes, the cathode of the first thyristor being coupled to the first node of the first power supply circuit by a first switch (D3; M_HS; M1; M_NEG; D2) and being connected to the fourth node, the second power supply circuit including a first rectifying element (DFL; DFL') coupled to the second node of the first power supply circuit and coupled to the third node.

The first rectifying element (DFL) may be a first diode.

The second power supply circuit (30, 40) may include a first capacitor (C_FL1, C_FL2) including a first electrode connected to the cathode of the first thyristor (SCR_F1).

The first switch may be a first MOS transistor (M_HS; M_LS).

The first switch may be a second diode (D3, D2).

The AC-DC conversion stage (10; 60; 65; 66; 67; 68) may include first and second terminals (12, 14) for the reception of an AC voltage ($V_{ac}$) and third and fourth terminals (16, 18) for the delivery of a DC voltage ($V_{dc}$).

Before the steady state, during a positive halfwave of the AC voltage ($V_{ac}$), the first power supply circuit (SHS) may be activated after the DC voltage ($V_{dc}$) has exceeded a threshold, so that afterwards, the first capacitor (C_FL1) may be charged by a current ($I_{DBL}$) flowing through the first rectifying element (DBL) when the first switch (M_HS) is controlled to the on state.

The converter may further include a second MOS transistor (M_LS) coupling the first node (20) of the first power supply circuit (SHS) to the fourth terminal (18), wherein the third terminal (16) may be connected to the cathode of the first thyristor (SCR_F1), and the second terminal (14) may be connected to the anode of the first thyristor (SCR_F1).

The converter may further include a second MOS transistor (M2) coupled to the first node (56) of the first power supply circuit (SHS) via an inductance (Lp) and connected to the fourth terminal (18), wherein the third terminal (16) may be connected to the cathode of the first thyristor (SCR_F1), and the second terminal (14) may be connected to the anode of the first thyristor (SCR_F1).

The second terminal (14) may be connected to the anode of the first thyristor (SCR_F1) and the first terminal (12) may be coupled to the first node (20) of the first power supply circuit (SHS) via an inductance (L_PFC).

The converter may further include a second MOS transistor (M_POS) connected to the first node (26) of the first power supply circuit (SHS), wherein the second terminal (14) may be connected to the cathode of the first thyristor (SCR_F2), wherein the first terminal (12) may be coupled to the second MOS transistor (M_POS) via an inductance (L_PFC), and the anode of the first thyristor may be connected to the fourth terminal (18).

The converter may further include a second thyristor (SCR_F1), wherein the cathode of the second thyristor may be connected to the cathode of the first thyristor (SCR_F2), and the first terminal (12) may be connected to the anode of the second thyristor.

The first terminal (12) may be coupled to the first MOS transistor (M_LS) via an inductance (L_PFC), and the second terminal (14) may be connected to the cathode of the first thyristor (SCR_F2), the anode of the first thyristor (SCR_F2) being coupled to the fourth terminal (18).

The converter may include a second switch (SW_Rech) coupling the cathode of the first thyristor (SCR_F2) to the fourth terminal (18).

The AC-DC conversion stage (70; 80; 90; 100) may include first and second terminals (12, 14) for the reception of an AC voltage ($V_{ac}$) and third and fourth terminals (16, 18) for the delivery of a DC voltage ($V_{dc}$).

The converter may include a second thyristor (SCR_F2) in series with the first thyristor (SCR_F1), a third power supply circuit (SDD) delivering a third reference voltage ($V_{DD}$) between the fourth terminal (18) and a fifth node, and a fourth power supply circuit (40) delivering a fourth reference voltage ($V_{C\_FL2}$) between sixth and seventh nodes (22), the cathode of the second thyristor being connected to the seventh node (22), the fourth power supply circuit including a second rectifying element (DFL') coupled to the fifth node of the third power supply circuit.

The second rectifying element (DFL') may be a third diode.

The fourth power supply circuit (40) may include a second capacitor (C_FL2) including a first electrode connected to the midpoint of the first and second thyristors (SCR_F1, SCR_F2).

The converter may include fourth and fifth diodes (D1, D2) series-coupled between the third and fourth terminals (16, 18).

The converter may include a second thyristor (SCR_F2) in series with the first thyristor (SCR_F1), and the midpoint of the fourth and fifth diodes (D1, D2) may be coupled to the midpoint of the first and second thyristors (SCR_F1, SCR_F2) by a first resistor (R_ICL).

The converter may include first and second MOS transistors (M_HS, M_LS) series-coupled between the third and fourth terminals (16, 18), wherein the second rectifying element (DFL') may be a third diode, and, before the steady state, during a positive halfwave of the AC voltage ($V_{ac}$), the second capacitor (C_FL2) may be charged by a current ($I_{DFL}$) flowing through the first diode (DFL') and the fifth diode (D2).

The converter may include a second thyristor (SCR_F2) in series with the first thyristor (SCR_F1), and the first thyristor (SCR_F1) may be a cathode-gate thyristor and the second thyristor (SCR_F2) may be a cathode-gate thyristor.

The converter may include a second thyristor (SCR_F2) in series with the first thyristor (SCR_F1), wherein the first thyristor (SCR_F1) may be a cathode-gate thyristor and the second thyristor (SCR_F2) may be an anode-gate thyristor controlled by a positive or negative gate current.

The various embodiments described above can be combined to provide further embodiments. Aspects of the embodiments can be modified, if necessary to employ concepts of the various embodiments to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A converter comprising an AC-DC conversion stage, the AC-DC conversion stage including:
    a first terminal;
    a second terminal;
    a third terminal;
    a fourth terminal;
    a first thyristor and a second thyristor coupled in series between the third terminal and the fourth terminal;
    a first diode coupled between the third terminal and the fourth terminal;
    a first power supply circuit configured to deliver a first reference voltage between a first node and a second node of the first power supply circuit;
    a second power supply circuit configured to deliver a second reference voltage between a third node and a fourth node of the second power supply circuit, the second power supply circuit including:
        a first switch coupled between the first node and the fourth node,
        a cathode of the first thyristor coupled to the fourth node, the cathode of the first thyristor further coupled to the first node through the first switch, a first rectifying element coupled to the first power supply circuit through the second node, the first rectifying element further coupled to the third node, and a first resistor coupled between the first rectifying element and the third node; and a second switch coupled between the first node and the fourth terminal.

2. The converter according to claim 1, wherein the first rectifying element is a second diode.

3. The converter according to claim 1, wherein the second power supply circuit comprises a first capacitor having a first electrode coupled to the cathode of the first thyristor.

4. The converter according to claim 1, wherein the first switch is a first MOS transistor.

5. The converter according to claim 1, wherein the first switch is a second diode.

6. The converter according to claim 1, wherein the first diode includes a cathode coupled to the fourth node.

7. The converter according to claim 3, wherein, before a steady state, during a positive halfwave of a AC voltage, the first power supply circuit is configured to be activated in response to a DC voltage has exceeded a threshold, and the first capacitor is configured to be charged by a current flowing through the first rectifying element in response to the first switch is controlled to be at an ON state.

8. The converter according to claim 4, further comprising a second MOS transistor coupled between the first node of the first power supply circuit and the fourth terminal, wherein the third terminal is coupled to the cathode of the first thyristor, and wherein the second terminal is coupled to an anode of the first thyristor.

9. The converter according to claim 4, further comprising a second MOS transistor coupled to the first node of the first power supply circuit via an inductance and coupled to the fourth terminal, wherein the third terminal is coupled to the cathode of the first thyristor, and wherein the second terminal is coupled to an anode of the first thyristor.

10. The converter according to claim 1, wherein the second terminal is coupled to an anode of the first thyristor and wherein the first terminal is coupled to the first node of the first power supply circuit via an inductance.

11. The converter according to claim 4, further comprising a second MOS transistor coupled to the first node of the first power supply circuit, wherein the second terminal is coupled to the cathode of the first thyristor, wherein the first terminal is coupled to the second MOS transistor via an inductance, and wherein an anode of the first thyristor is coupled to the fourth terminal.

12. The converter according to claim 9, further comprising a second thyristor, wherein a cathode of the second thyristor is coupled to the cathode of the first thyristor, and wherein the first terminal is coupled to an anode of the second thyristor.

13. The converter according to claim 4, wherein the first terminal is coupled to the first MOS transistor via an inductance, the second terminal is coupled to the cathode of the first thyristor, and an anode of the first thyristor is coupled to the fourth terminal.

14. The converter according to claim 13, comprising a second switch coupled between the cathode of the first thyristor and the fourth terminal.

15. The converter according to claim 3, wherein the first resistor is coupled between the first capacitor and the first rectifying element.

16. A converter comprising an AC-DC conversion stage, the AC-DC conversion stage including:
a first terminal and a second terminal configured to receive an AC voltage;
a third terminal and a fourth terminal configured to deliver a DC voltage;
a first thyristor;
a first power supply circuit delivering a first reference voltage between a first node and a second node of the first power supply;
a second power supply circuit delivering a second reference voltage between third and fourth nodes of the second power supply, the cathode of the first thyristor being coupled to the first node of the first power supply circuit via a first switch and being coupled to the fourth node, the second power supply circuit including a first rectifying element coupled to the second node of the first power supply circuit and coupled to the third node;
a second thyristor coupled in series with the first thyristor;
a second switch coupled to the first node, opposite the first switch;
a third power supply circuit configured to deliver a third reference voltage between the fourth terminal and a fifth node; and
a fourth power supply circuit configured to deliver a fourth reference voltage between a sixth node and a seventh node, the fourth power supply circuit including a second rectifying element coupled to the fifth node of the third power supply circuit
wherein a cathode of the second thyristor is coupled to the seventh node.

17. The converter according to claim 16, wherein the fourth power supply circuit includes a second capacitor having a first electrode coupled to a first midpoint between the first and second thyristors.

18. The converter according to claim 17, comprising:
a first diode and a second diode coupled in series between the third and fourth terminals; and
a second midpoint between the first and second diodes coupled to the first midpoint between the first and second thyristors via a first resistor.

19. An AC-DC converter, comprising:
a first input terminal and a second input terminal configured to receive an AC signal;
a DC output terminal coupled to a ground terminal via a first capacitor;
a first switch coupled between the first input terminal and the DC output terminal;
a second switch coupled between the first input terminal and the ground terminal;
a first thyristor coupled between the second input terminal and the DC output terminal;
a second thyristor coupled between the second input terminal and the ground terminal;
a first diode coupled between the second input terminal and the DC output terminal, the first diode including a cathode coupled to the DC output terminal; and
a second diode coupled between the second input terminal and the ground terminal, the second diode including a cathode coupled to the second input terminal.

20. The AC-DC converter according to claim 19, wherein the first diode and the second diode are coupled in series between the DC output terminal and the ground terminal, and
wherein the second input terminal is coupled to a midpoint between the first diode and the second diode via a resistor.

21. A device, comprising:
an AC-DC conversion stage, the AC-DC conversion stage including:
  a first terminal;
  a second terminal;
  a third terminal;
  a fourth terminal;
  a first thyristor coupled between the second terminal and the third terminal;
  a first diode coupled between the second terminal and the third terminal, the first diode including a cathode coupled to the third terminal;
  a first power supply circuit coupled to the first terminal, the first power supply circuit configured to deliver a first reference voltage;
  a second power supply circuit coupled between the first power supply circuit and the third terminal, the second power supply circuit configured to deliver a second reference voltage, the second power supply circuit including:
    a first rectifying element coupled between the first power supply circuit and the third terminal;
    a cathode of the first thyristor coupled to third terminal, the cathode of the first thyristor coupled to the first power supply circuit via the first switch, the cathode of the first thyristor coupled to the second power supply; and
    a first resistor coupled between the first rectifying element and the third terminal.

22. The converter according to claim 21, further comprising:
  a second thyristor coupled in series with the first thyristor;
  a third power supply circuit configured to deliver a third reference voltage between the second terminal and the fourth terminal; and
  a fourth power supply circuit configured to deliver a fourth reference voltage between the third power supply circuit and the second terminal, the fourth power supply circuit including a second rectifying element coupled between the third power supply circuit and the fourth power supply circuit, the fourth power supply circuit including a second capacitor having a first electrode coupled between the first and second thyristors.

23. The converter according to claim 21, further comprising:
  a second diode coupled in series with the first diode, the second diode including an anode coupled to the third terminal.

* * * * *